United States Patent
Ziegenspeck et al.

(10) Patent No.: US 12,244,963 B2
(45) Date of Patent: Mar. 4, 2025

(54) VEHICULAR VISION SYSTEM

(71) Applicant: MAGNA ELECTRONICS INC., Auburn Hills, MI (US)

(72) Inventors: Sven Ziegenspeck, Bad Neuenahr-Ahrweiler (DE); Pirmin Bader, Haibach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 38 days.

(21) Appl. No.: 18/487,151

(22) Filed: Oct. 16, 2023

(65) Prior Publication Data

US 2024/0056550 A1 Feb. 15, 2024

Related U.S. Application Data

(63) Continuation of application No. 18/067,983, filed on Dec. 19, 2022, now Pat. No. 11,792,360, which is a continuation of application No. 17/656,067, filed on Mar. 23, 2022, now Pat. No. 11,533,452, which is a continuation of application No. 17/303,148, filed on May 21, 2021, now Pat. No. 11,290,679, which is a continuation of application No. 16/792,430, filed on Feb. 17, 2020, now Pat. No. 11,025,859, which is a
(Continued)

(51) Int. Cl.
*H04N 7/10* (2006.01)
*H04N 7/18* (2006.01)

(52) U.S. Cl.
CPC ............... *H04N 7/10* (2013.01); *H04N 7/183* (2013.01)

(58) Field of Classification Search
CPC ................................. H04N 7/10; H04N 7/183
See application file for complete search history.

(56) References Cited

U.S. PATENT DOCUMENTS

| | | |
|---|---|---|
| 4,443,769 A | 4/1984 | Aschwanden et al. |
| 4,485,398 A | 11/1984 | Chapin, Jr. et al. |
| 4,987,357 A | 1/1991 | Masaki |

(Continued)

FOREIGN PATENT DOCUMENTS

| | | |
|---|---|---|
| CN | 101082489 A | 12/2007 |
| DE | 10036875 A1 | 2/2002 |

(Continued)

OTHER PUBLICATIONS

Foresight CCTV, Inc., "Two Video with Alarm Signals Transmission Set", 2003.

*Primary Examiner* — Jae N Noh
(74) *Attorney, Agent, or Firm* — HONIGMAN LLP

(57) ABSTRACT

A vehicular vision system includes an electronic control unit (ECU) installed in a vehicle that connects via a plurality of coaxial cables of the vehicle with a plurality of vehicular cameras of the vehicle. Each camera is operable to capture image data. The coaxial cables (i) carry image data captured by the respective camera from the respective camera to the ECU, (ii) carries camera control data from the ECU to the respective camera and (iii) connects a DC power supply of the ECU to the respective camera for powering the respective camera. The camera control data is carried by the respective coaxial cable from the ECU to the respective camera at a control data carrier frequency that is lower than an image data carrier frequency at which image data captured by the respective camera is carried by the respective coaxial cable from the respective camera to the ECU.

68 Claims, 13 Drawing Sheets

Related U.S. Application Data continuation of application No. 14/297,663, filed on Jun. 6, 2014, now Pat. No. 10,567,705.

(60) Provisional application No. 61/864,837, filed on Aug. 12, 2013, provisional application No. 61/833,080, filed on Jun. 10, 2013.

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |

(56) References Cited

U.S. PATENT DOCUMENTS

| | | |
|---|---|---|
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A | 9/2000 | Baker |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,326 B1 | 11/2002 | Partynski et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,381,089 B2 | 6/2008 | Hosler, Sr. |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,843,235 B2 | 11/2010 | Yanbo et al. |
| 7,855,755 B2 | 12/2010 | Weller et al. |
| 7,881,496 B2 | 2/2011 | Camilleri et al. |
| 7,925,441 B2 | 4/2011 | Maemura et al. |
| 7,952,490 B2 | 5/2011 | Fechner et al. |
| 7,965,336 B2 | 6/2011 | Bingle et al. |
| 8,013,780 B2 | 9/2011 | Lynam |
| 8,027,029 B2 | 9/2011 | Lu et al. |
| 8,849,495 B2 | 9/2014 | Chundrlik, Jr. et al. |
| 8,908,039 B2 | 12/2014 | De Wind et al. |
| 9,126,525 B2 | 9/2015 | Lynam et al. |
| 9,210,307 B2 | 12/2015 | Gebauer et al. |
| 9,318,020 B2 | 4/2016 | Salomonsson et al. |
| 9,900,490 B2 | 2/2018 | Ihlenburg et al. |
| 10,284,764 B2 | 5/2019 | Ihlenburg et al. |
| 10,567,633 B2 | 2/2020 | Ihlenburg et al. |
| 10,567,705 B2 | 2/2020 | Ziegenspeck et al. |
| 11,025,859 B2 | 6/2021 | Ziegenspeck et al. |
| 11,290,679 B2 | 3/2022 | Ziegenspeck et al. |
| 11,533,452 B2 | 12/2022 | Ziegenspeck et al. |
| 11,792,360 B2 | 10/2023 | Ziegenspeck et al. |
| 2002/0015153 A1 | 2/2002 | Downs |
| 2002/0037054 A1 | 3/2002 | Schurig |
| 2002/0113873 A1 | 8/2002 | Williams |
| 2002/0149679 A1 | 10/2002 | Deangelis et al. |
| 2002/0167589 A1 | 11/2002 | Schofield et al. |
| 2003/0081120 A1 | 5/2003 | Klindworth |
| 2003/0103141 A1 | 6/2003 | Bechtel et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0200467 A1 | 9/2005 | Au et al. |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0091813 A1 | 5/2006 | Stam et al. |
| 2006/0103727 A1 | 5/2006 | Tseng |
| 2006/0133476 A1 | 6/2006 | Page et al. |
| 2006/0164221 A1 | 7/2006 | Jensen |
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0232670 A1 | 10/2006 | Chu |
| 2006/0250501 A1 | 11/2006 | Widmann et al. |
| 2006/0254805 A1 | 11/2006 | Scherer et al. |
| 2006/0290479 A1 | 12/2006 | Akatsuka et al. |
| 2007/0104476 A1 | 5/2007 | Yasutomi et al. |
| 2007/0206835 A1 | 9/2007 | Abe |
| 2007/0297784 A1 | 12/2007 | Wong et al. |
| 2008/0042812 A1 | 2/2008 | Dunsmoir et al. |
| 2008/0049344 A1 | 2/2008 | DeWard et al. |
| 2009/0093938 A1 | 4/2009 | Isaji et al. |
| 2009/0113509 A1 | 4/2009 | Tseng et al. |
| 2009/0167465 A1 | 7/2009 | Martch et al. |
| 2009/0174765 A1 | 7/2009 | Namba et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |

(56) References Cited

U.S. PATENT DOCUMENTS

| | | |
|---|---|---|
| 2009/0265069 A1 | 10/2009 | Desbrunes |
| 2009/0273524 A1 | 11/2009 | Furuya et al. |
| 2010/0002081 A1 | 1/2010 | Pawlicki et al. |
| 2010/0020170 A1 | 1/2010 | Higgins-Luthman et al. |
| 2010/0045799 A1 | 2/2010 | Lei et al. |
| 2010/0076621 A1 | 3/2010 | Kubotani et al. |
| 2010/0088021 A1 | 4/2010 | Viner et al. |
| 2010/0110939 A1 | 5/2010 | Fukuda |
| 2010/0194886 A1 | 8/2010 | Asari et al. |
| 2010/0228437 A1 | 9/2010 | Hanzawa et al. |
| 2011/0025489 A1 | 2/2011 | Shimoda et al. |
| 2011/0074916 A1 | 3/2011 | Demirdjian |
| 2011/0095908 A1 | 4/2011 | Nadeem et al. |
| 2011/0103650 A1 | 5/2011 | Cheng et al. |
| 2011/0228088 A1 | 9/2011 | Gloger |
| 2011/0286544 A1 | 11/2011 | Avudainayagam et al. |
| 2012/0044066 A1 | 2/2012 | Mauderer et al. |
| 2012/0050550 A1 | 3/2012 | Oba et al. |
| 2012/0062743 A1 | 3/2012 | Lynam et al. |
| 2012/0127062 A1 | 5/2012 | Bar-Zeev et al. |
| 2012/0154591 A1 | 6/2012 | Baur et al. |
| 2012/0186447 A1 | 7/2012 | Hodgson et al. |
| 2012/0218412 A1 | 8/2012 | Dellantoni et al. |
| 2012/0239242 A1 | 9/2012 | Uehara |
| 2012/0262340 A1 | 10/2012 | Hassan et al. |
| 2013/0103259 A1 | 4/2013 | Eng et al. |
| 2013/0124052 A1 | 5/2013 | Hahne |
| 2013/0129150 A1 | 5/2013 | Saito |
| 2013/0131918 A1 | 5/2013 | Hahne |
| 2013/0134964 A1 | 5/2013 | Ahrentorp et al. |
| 2013/0187445 A1 | 7/2013 | Mutzabaugh |
| 2013/0242413 A1 | 9/2013 | Baba |
| 2014/0067206 A1 | 3/2014 | Pflug |
| 2014/0156157 A1 | 6/2014 | Johnson et al. |
| 2014/0160291 A1 | 6/2014 | Schaffner |
| 2014/0176711 A1 | 6/2014 | Kirchner et al. |
| 2014/0218531 A1 | 8/2014 | Michiguchi et al. |
| 2014/0218535 A1 | 8/2014 | Ihlenburg et al. |
| 2014/0222280 A1 | 8/2014 | Salomonsson et al. |
| 2014/0313339 A1 | 10/2014 | Diessner |
| 2014/0340510 A1 | 11/2014 | Ihlenburg et al. |
| 2014/0362209 A1 | 12/2014 | Ziegenspeck et al. |
| 2014/0379233 A1 | 12/2014 | Chundrlik, Jr. et al. |

FOREIGN PATENT DOCUMENTS

| | | |
|---|---|---|
| EP | 2247047 A1 | 11/2010 |
| WO | 2010110957 A2 | 9/2010 |
| WO | 2010144900 A1 | 12/2010 |
| WO | 2011028686 A1 | 3/2011 |
| WO | 2013043661 A1 | 3/2013 |
| WO | 2013081985 A1 | 6/2013 | ally, the present invention may also reduce the need for having a processor in the camera. Optionally, and in accordance with the present invention, DC power for powering the camera may be carried over the same coaxial line (from the ECU or image receiving device).

These and other objects, advantages, purposes and features of the present invention will become apparent upon review of the following specification in conjunction with the drawings.

VEHICULAR VISION SYSTEM

CROSS REFERENCE TO RELATED APPLICATIONS

The present application is a continuation of U.S. patent application Ser. No. 18/067,983, filed Dec. 19, 2022, now U.S. Pat. No. 11,792,360, which is a continuation of U.S. patent application Ser. No. 17/656,067, filed Mar. 23, 2022, now U.S. Pat. No. 11,533,452, which is a continuation of U.S. patent application Ser. No. 17/303,148, filed May 21, 2021, now U.S. Pat. No. 11,290,679, which is a continuation of U.S. patent application Ser. No. 16/792,430, filed Feb. 17, 2020, now U.S. Pat. No. 11,025,859, which is a continuation of U.S. patent application Ser. No. 14/297,663, filed Jun. 6, 2014, now U.S. Pat. No. 10,567,705, which claims the filing benefits of U.S. provisional applications, Ser. No. 61/864,837, filed Aug. 12, 2013, and Ser. No. 61/833,080, filed Jun. 10, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

The present invention provides for the transfer of some or all data (such as image data captured by a camera and camera control data for use by the camera) over just one coaxial line (cable) and to eliminate the need of LIN or CAN transceivers, such as by transferring control data via at least one analog signal such as via modulation to a (sinusoidal) carrier wave, which has a frequency that is off or outside the bandwidth of the frequency of the image data FBAS (or other analog or digital image data format/encryption/modulation) signal (and decoupling/demodulating/filtering both signals at the other end of the data line). The term FBAS-signal stands for Farb-Bild-Austast-Synchron-Signal (in English, such a signal is commonly referred to as CVBS, which stands for Color, Video, Blanking, and Sync). Option-

LEGEND

Figure 1:
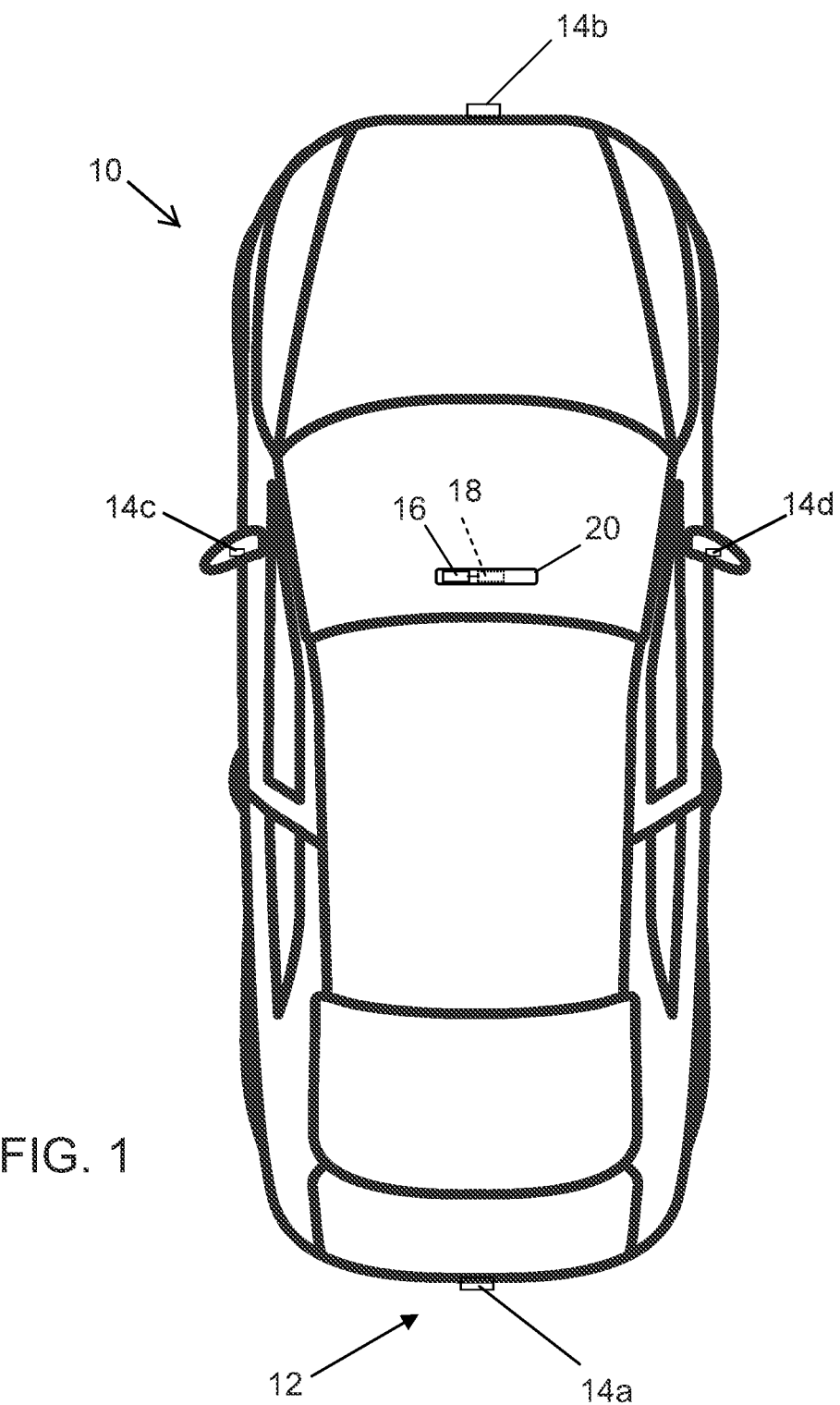
FIG. 1 is a plan view of a vehicle with a vision system that incorporates cameras in accordance with the present invention.

20 Camera device according the invention
21 Imager
22 parallel digital video (RGB)
23 I^2C data transmission
24 Analog Signal diver/receiver/modulator and encoder for FBAS signal
25 Coaxial cable line
26 Analog Signal diver/receiver/modulator/decoder and filter for FBAS signal
27 Video signal (alone), e.g., FBAS
28 bidirectional data signal (alone)
29 Image control and processing unit
30 ECU according the invention
31 Video encoder digital to analog (e.g., FBAS)
32 LIN/CAN transceiver
33 twisted pair line
34 LIN/CAN line (of any nature)
35 LIN/CAN transceiver
36 Video decoder
37 Sync detector and timing logic for camera
38 Video buffer
39 Data buffer camera
40 Known art camera device
50 ECU of known art
61 Data buffer ECU
62 Driver or modulator
63 Receiver or demodulator
64 Mixer or modulator
65 Filter or demodulator
66 Data switch
67 Switch timing signal
70 Video modulator, e.g., frequency adder camera side
71 Data demodulator camera side
72 Data demodulator ECU side
73 High pass filter
74 Band pass filter
75 Low pass filter
76 Video demodulator ECU side
77 Data modulator camera side
78 Data modulator ECU side
79 (highest) HF signal source or generator
80 (medium high) HF signal source or generator
81 (lowest) LF signal source or generator
82 Camera supply DC power source ECU side
83 Camera supply DC power node camera side
84 AC/DC filter
85 Camera data (e.g., intrinsic parameter)
86 Camera control data (e.g., white balance)
90 Camera supply AC power source ECU side
91 Camera supply AC power node camera side
92 Camera supply DC power node camera side
93 High pass filter
94 Band pass filter—high
95 Band pass filter—low
96 Schottky diode
210 Imager with on chip μC

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, known art analog automotive vision system cameras, particularly rear and surround view cameras, have no bidirectional data transmission lines and are typically mono-directional. Typically, such mono-directional camera systems use a twisted pair cable to transfer an analog signal of the cameras, such as images captured by the camera's imager to an ECU or image receiving device. A typically used signal format is FBAS. The power cable is typically separate from the data line as another cable plugged into the camera.

International Publication Nos. WO 2013/081985 and/or WO 2013/043661, which are hereby incorporated herein by reference in their entireties, suggest use of a bidirectional digital data transmission of mono-directional camera image data and bidirectional camera parameter or calibration data over one coaxial cable via an asymmetrically (shield on ground as one node/terminal and a coaxial core as the second node/terminal) driven LVDS driver plus the camera DC-power coupled and supplied by the image receiving device.

Figure 2:
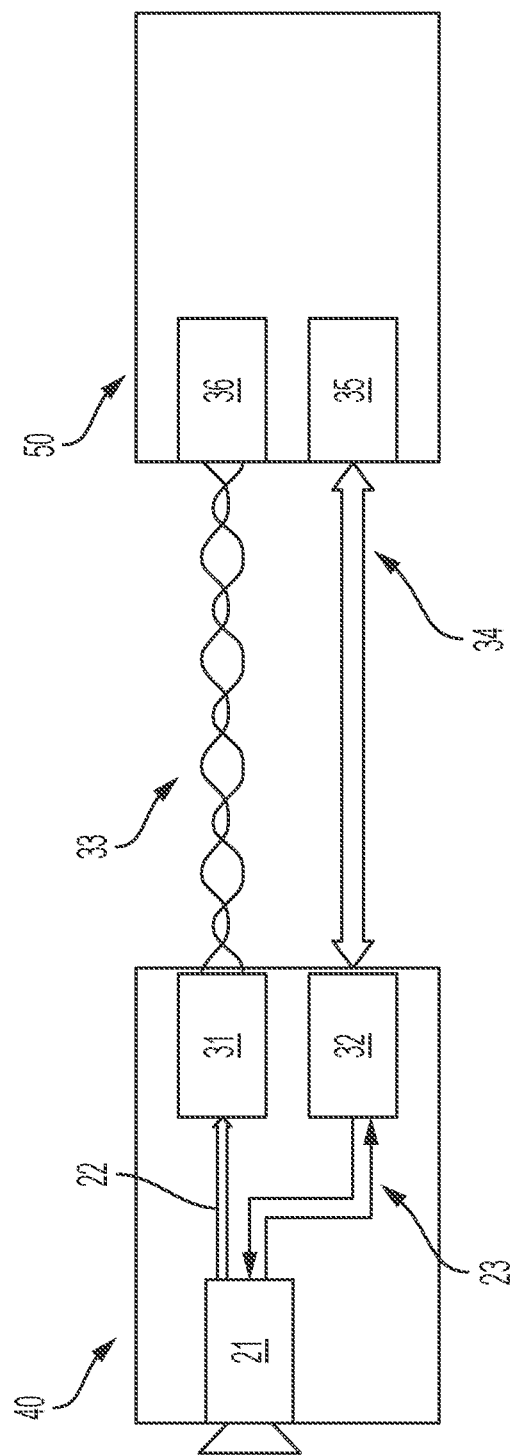
FIG. 2 is a schematic of a known LIN calibration data and FBAS image data transmission.

Relatively primitive high volume, low cost analog (especially FBAS) cameras typically cannot be controlled by an ECU since there is no back channel. Also, low cost digital cameras often have no control input or channel. When control via a back channel is desired, a LIN or CAN connection is typically the chosen bus. Twisted pair wired LVDS or Ethernet networks are also known (capable for bidirectional data transfer), such as shown in the schematic of FIG. 2. Mono-directional calibration data (to the camera or cameras) may include white balance, brightness or illumination control, pseudo synchronization, contrast enhancement, frame rate (untypically on FBAS), overlay switching, image cropping control (such as for transferring a reduced amount of image data by transferring a limited region of interest that is smaller than the full image or a limited amount of color channels of the image). When extrinsic or intrinsic parameters transfer from the camera to the ECU, a data channel from the camera to the ECU is necessary (beside the video data channel). As described in International Publication Nos. WO 2013/043661, which is hereby incorporated herein by reference in its entirety, camera parameter data parallel transmission via the video frame data stream is provided by adding the data to the video frames. Such a solution lacks suitable imagers that produce a data frame and such images tend to be too expensive due to the additional circuitry to generate data frames. Also, when using more than one camera having inter camera controls or balancing parameters, such parameters may be transmitted to and from the cameras, possibly via other nodes in between such as the ECU eventually via other nodes or gateways. Each of the ECU and the camera(s) needs to possess a twisted pair LIN/CAN/Ethernet/LVDS transceiver and a (typically small) processor for data transmission and handling accordingly. The data transfer between the imager and periphery inside the camera is typically done by I˜2C. The imager typically provides image data signals by parallel digital (RGB) video or FBAS (see FIG. 2). If not done via inductive coupling to LVDS via coax as described above, the camera supply is typically done via an extra cable or wire incorporated in the bunch of data wires, typically in DC.

Due to cost advantages, there is the desire to reduce the costs by reducing the number of lines, connectors and expensive components for camera image (mono-directional) and control data transfer (bidirectional) and power supply.

Figure 3:
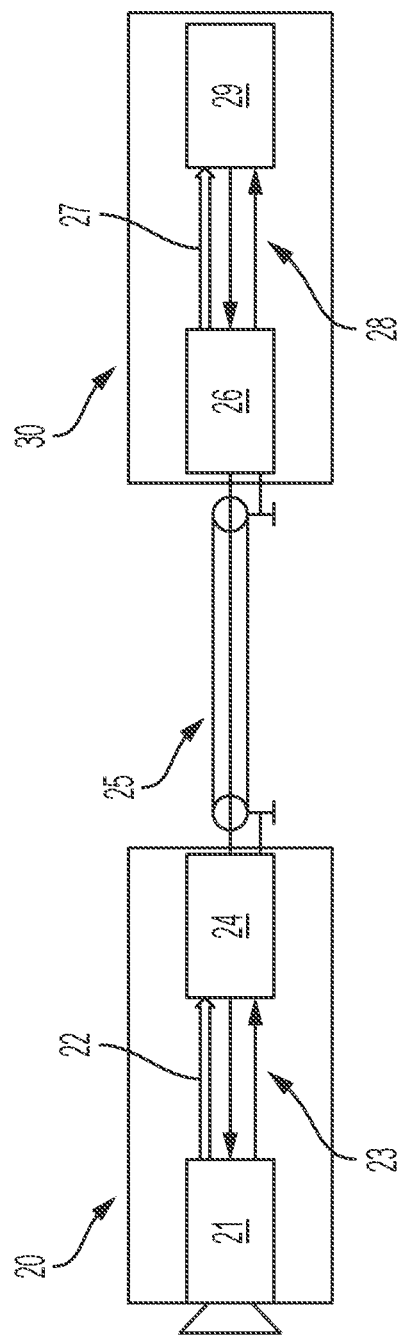
FIG. 3 is a schematic of a data transmission system and cable in accordance with the present invention.
Figure 4A:
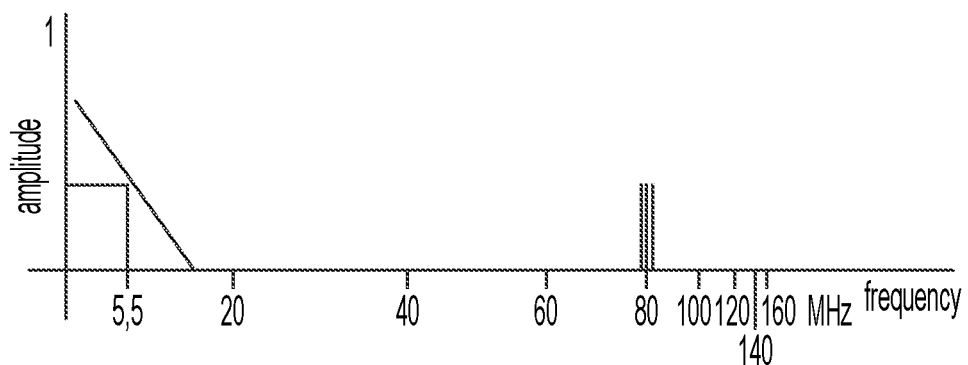
FIG. 4A is a graph of carrier frequencies that may be selected for a data channel beside the video data channel of the system of the present invention.

By transferring control data via at least one analog signal especially via modulation to a (sinusoidal) carrier wave, which has a frequency that is off or outside of the bandwidth of and with sufficient Shannon distance (or Nyquist distance) from the frequency of the image data FBAS (or other analog or digital image data format/encryption/modulation) signal (such as shown in FIG. 4A) (and decoupling/demodulating/filtering both signals at the other end of the data line), the present invention may transfer all data over just one coaxial line (cable) and may eliminate the need of LIN or CAN transceivers (see FIG. 3). The side bands of a carrier signal due to the signal modulation (the widths of the data bandwidths) must have a suitable distance to be filtered from one another. Otherwise, the Shannon-Nyquist criteria is infringed or in other words the (minimal) Shannon-Nyquist distance wasn't reflected when choosing the carriers. A greater distance is preferred when using relatively simple filters. Because the coaxial cable 'Ether' is generally empty beside the camera control signals and image data signals and power signals, the system of the present invention can use large distances between the frequencies, so long as the system has the carrier base waves generated for such signals and distances.

Depending on the further circuits and imager interfaces, the present invention may optionally also reduce the need for having a processor in the camera (maybe just using an ASIC). As another option, the present invention may transfer the DC power for the camera as well over the same coaxial line (see FIGS. 7A and 8A) (from the ECU or image receiving device) such as similar to the DC power via coaxial cable coupling/decoupling solution described in International Publication No. WO 2013/043661, incorporated above. Shown in there as positive node the core wire may be used and as negative node the coaxial cable's shielding. As an additional aspect of the invention, a coaxial cable with two shielding layers and one core wire may be used instead. Optionally, the DC may be supplied via both shield layers. Optionally, and desirably, the negative layer or ground layer may be the inner shielding layer and the positive node may be applied to the outer shielding layer for better signal annuity. The positive node may be capacitively set to the signal ground as well for conserving the double shielding effect for the signal (but not grounding the positive node in DC). By that optional configuration the DC coupling impedances may be saved.

Figure 7A:
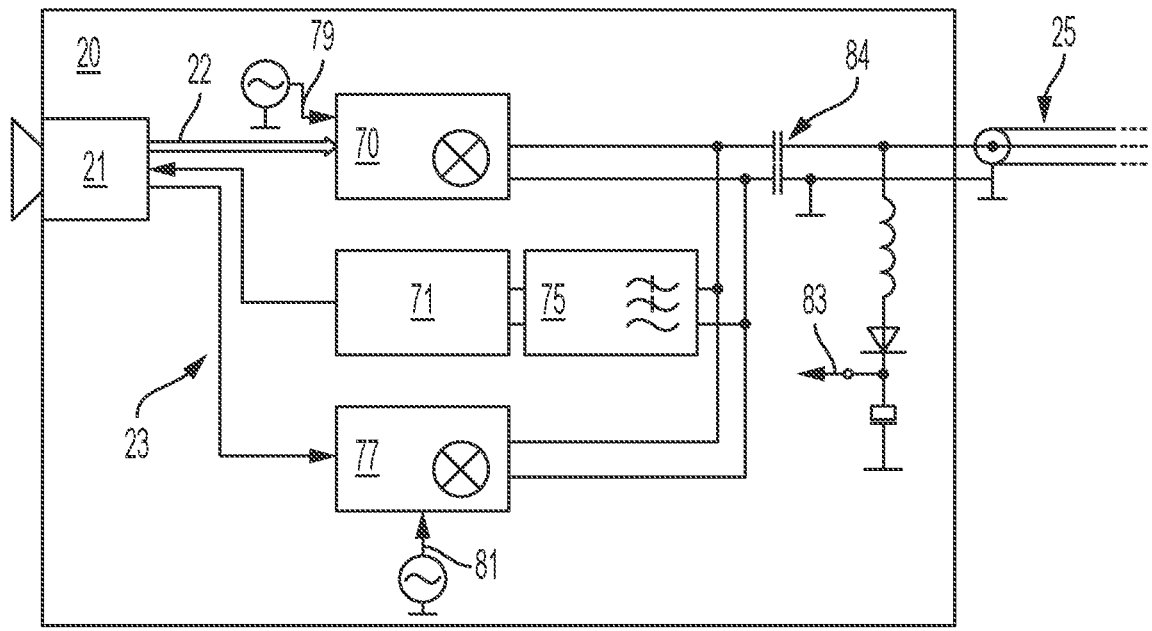
FIGS. 7A and 8A are schematics of imaging systems of the present invention transmitting both the video data of the camera and bidirectional (parameter and control) data modulated each on different carrier waves (see FIG. 4D), with a circuit shown for transmitting DC supply current from the ECU to the camera.
Figure 7B:
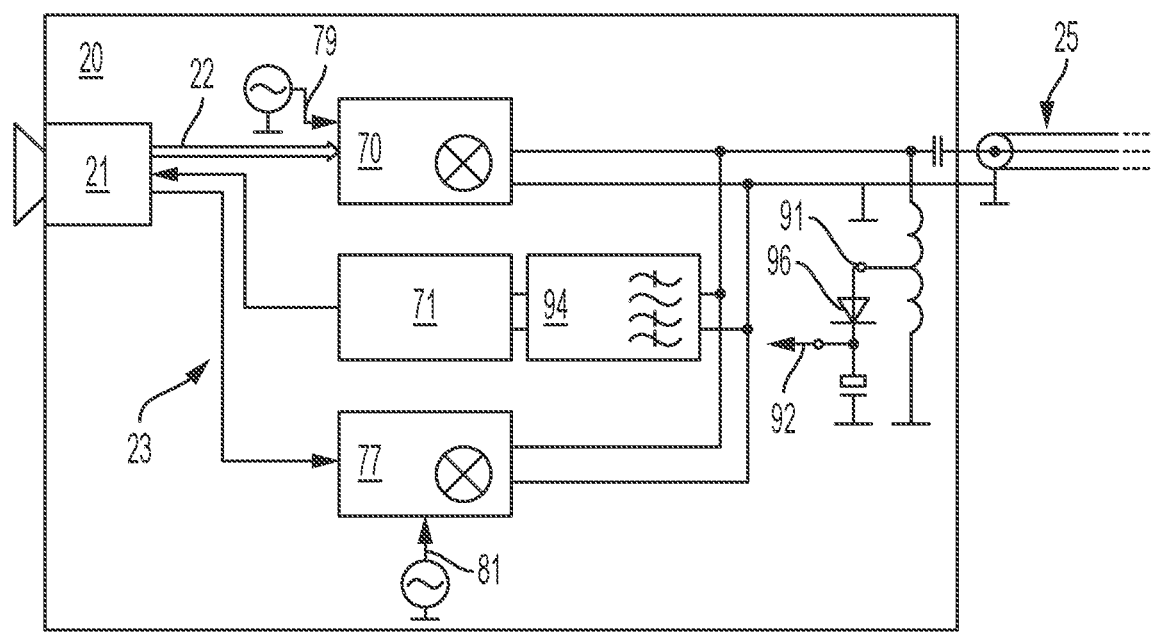
FIGS. 7B and 8B are schematics of imaging systems of the present invention transmitting both the video data of the camera and bidirectional (parameter and control) data modulated each on different carrier waves, with a circuit shown for transmitting AC supply current from the ECU to the camera (in accordance with a frequency spectrum such as shown in FIG. 4E)
Figure 8A:
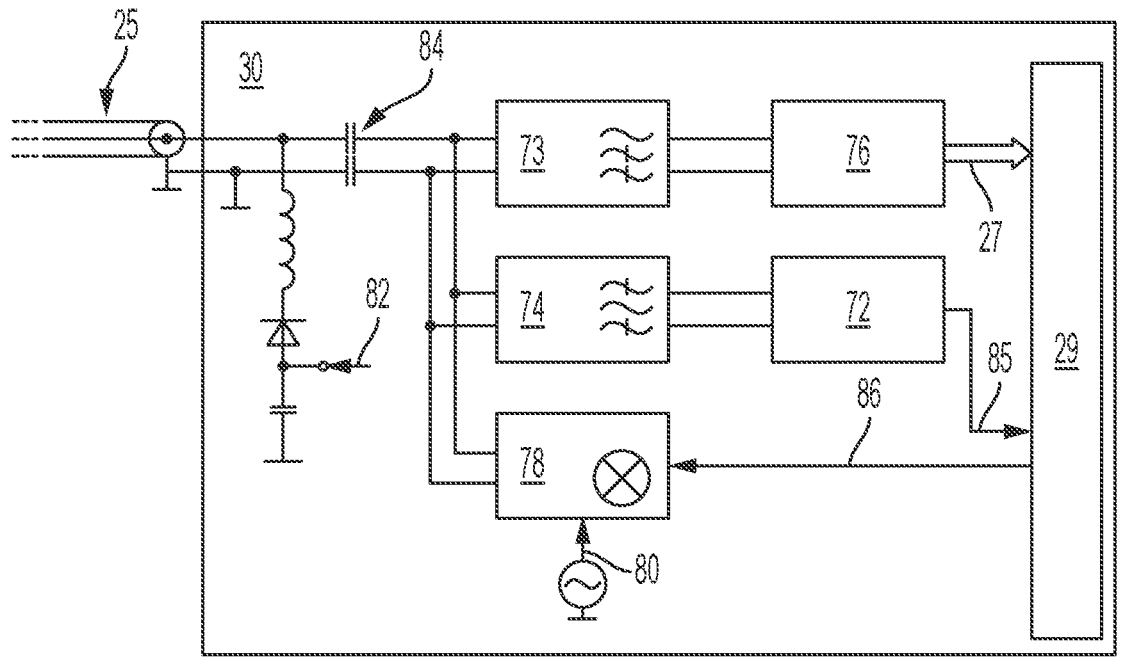
Figure 8B:
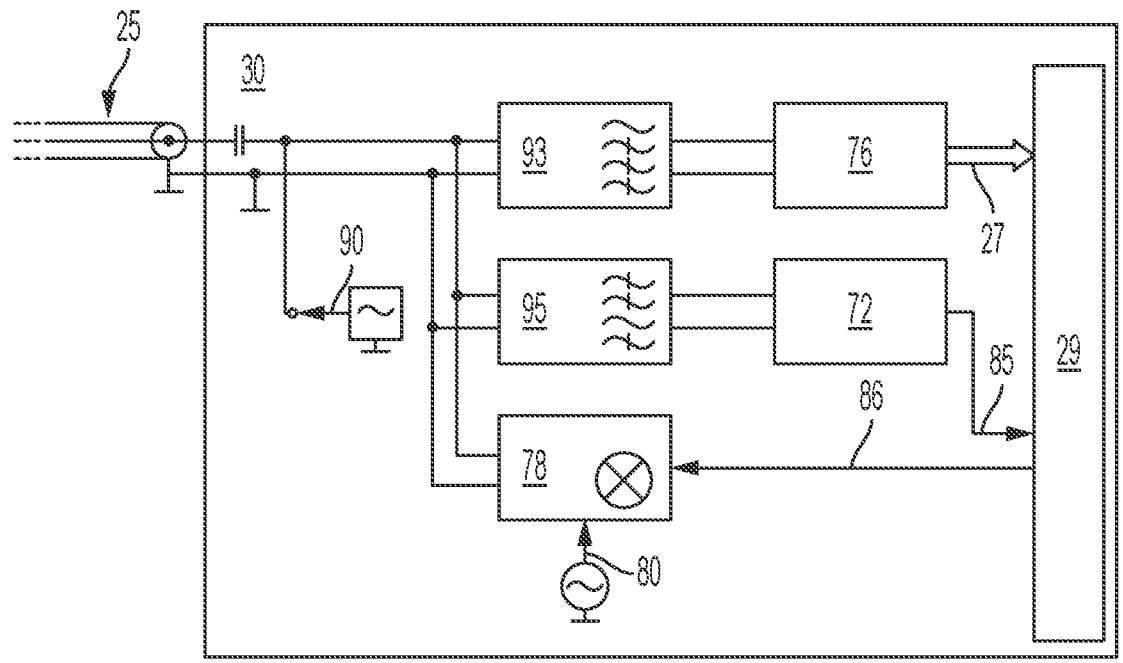

As an alternative optional solution, the camera supply may be achieved by transmitting the supply power not as DC but as alternating current (AC) via a mono or multiple shield coaxial cable, such as shown in FIGS. 7B and 8B. Optionally, the AC supply may be used as carrier wave. The video or control data may be modulated onto that carrier. Optionally, both may be modulated to the carrier. That may reduce the necessarily to generate a different carrier frequency than the supply AC frequency. Optionally, the video and control date may be modulated to different frequencies than the supply AC's frequency having sufficient Shannon distance to it and each other such as shown in the spectrum diagram of FIG. 4E and the circuits in FIGS. 7A, 8A, 7B and 8B. These figures show HF sources for delivering the carrier waves to the modulators. These may be generated separately or may be sourced by the imager frequency. Typically, there are divisions and multiples of the imager frequency present on the camera circuit board anyway.

For AC power transmission via a coaxial cable, the most primitive circuit at power consumer side (the camera side) may be set up by just one impedance, a diode and a capacitor. In FIG. 7B, an exemplary circuit is shown. The diode cuts the bottom of the AC supply wave, the capacitor on node 92 is for providing power during the negative signal half wave. Optionally, the coil may have multiple voltage taps when the consumer side system (camera system) requires more than one source voltage. Optionally, more voltage smoothing measures may be comprised in the consecutive circuits to smooth the voltage more when required. For making the consumer side capable to send data, the most primitive solution may be to substantially shortcut both nodes of the inductivity in short duration. This will equate to a primitive amplitude modulation with the short cut change pattern as its base frequency (selected in a Shannon distance to the AC supply frequency and other signal carrier frequencies).

Figure 12:
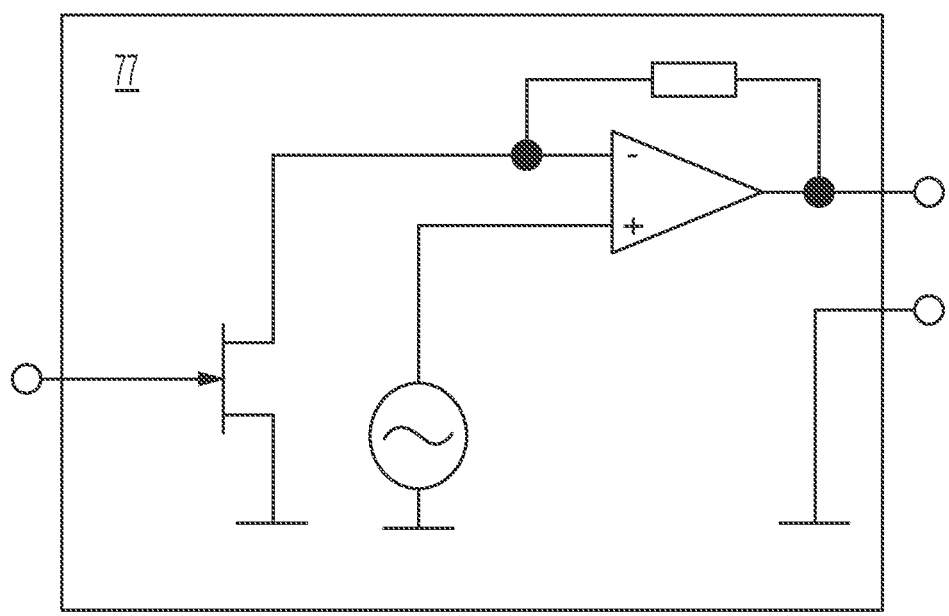
FIG. 12 is a basic driver circuit, which may be used as a modulator block for the circuits of FIGS. 7A and 7B.

FIG. 12 shows a basic driver circuit which may be used as the modulator block 77 in FIGS. 7A and 7B. The digital input switches the carrier to the output on and off. This will equate to an amplitude modulation with the signal frequency as side band distance to the supplied carrier frequency 81.

Figure 9:
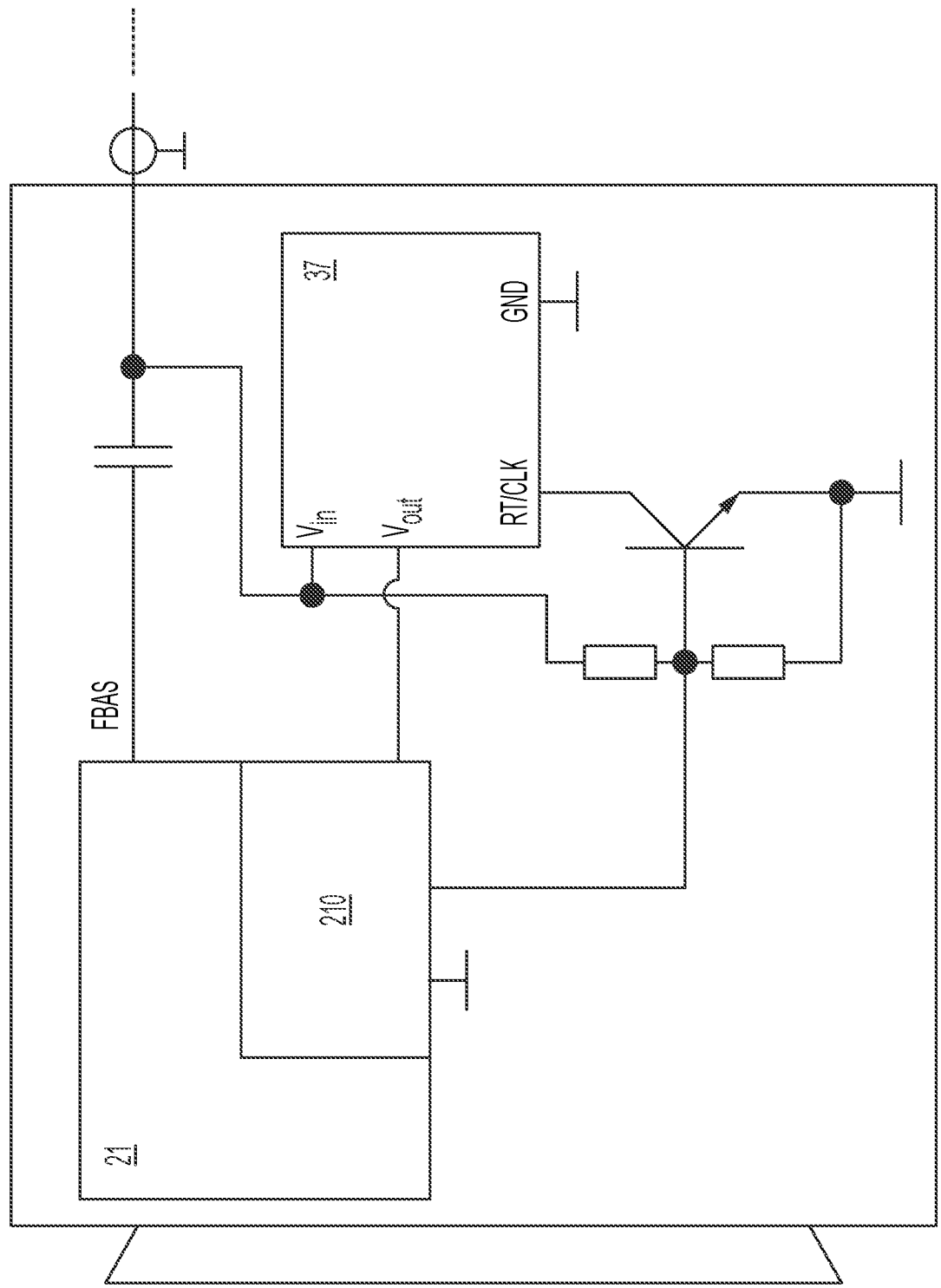
FIG. 9 is a schematized circuit diagram of how a camera inherent power converter can be used as an amplitude modulator for sending camera data (mono-directional)
Figure 10:
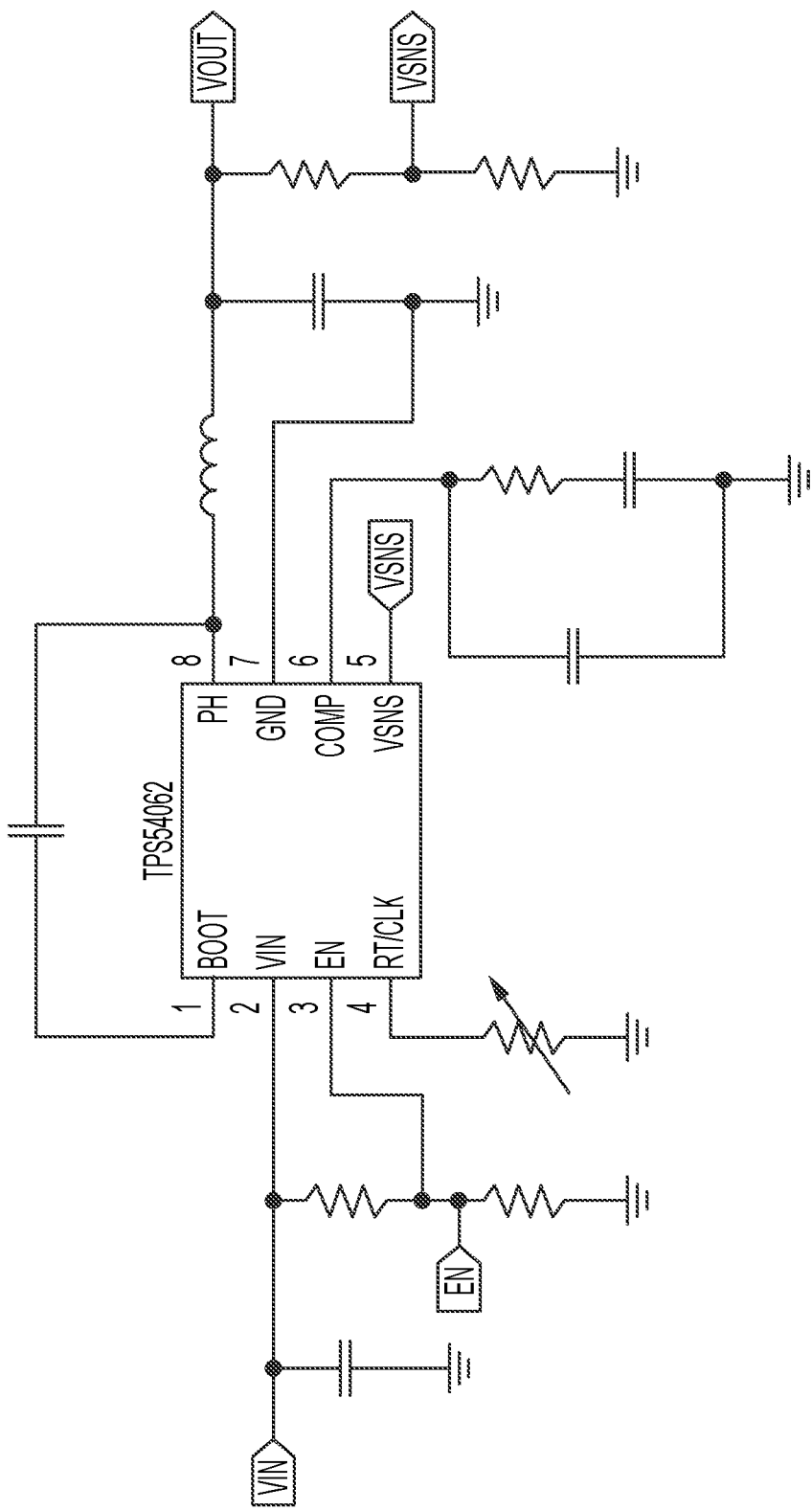
FIG. 10 is a simplified schematic of a TPS54062, which may be used as power converter in the schematized circuit diagram of FIG. 9.
Figure 11:
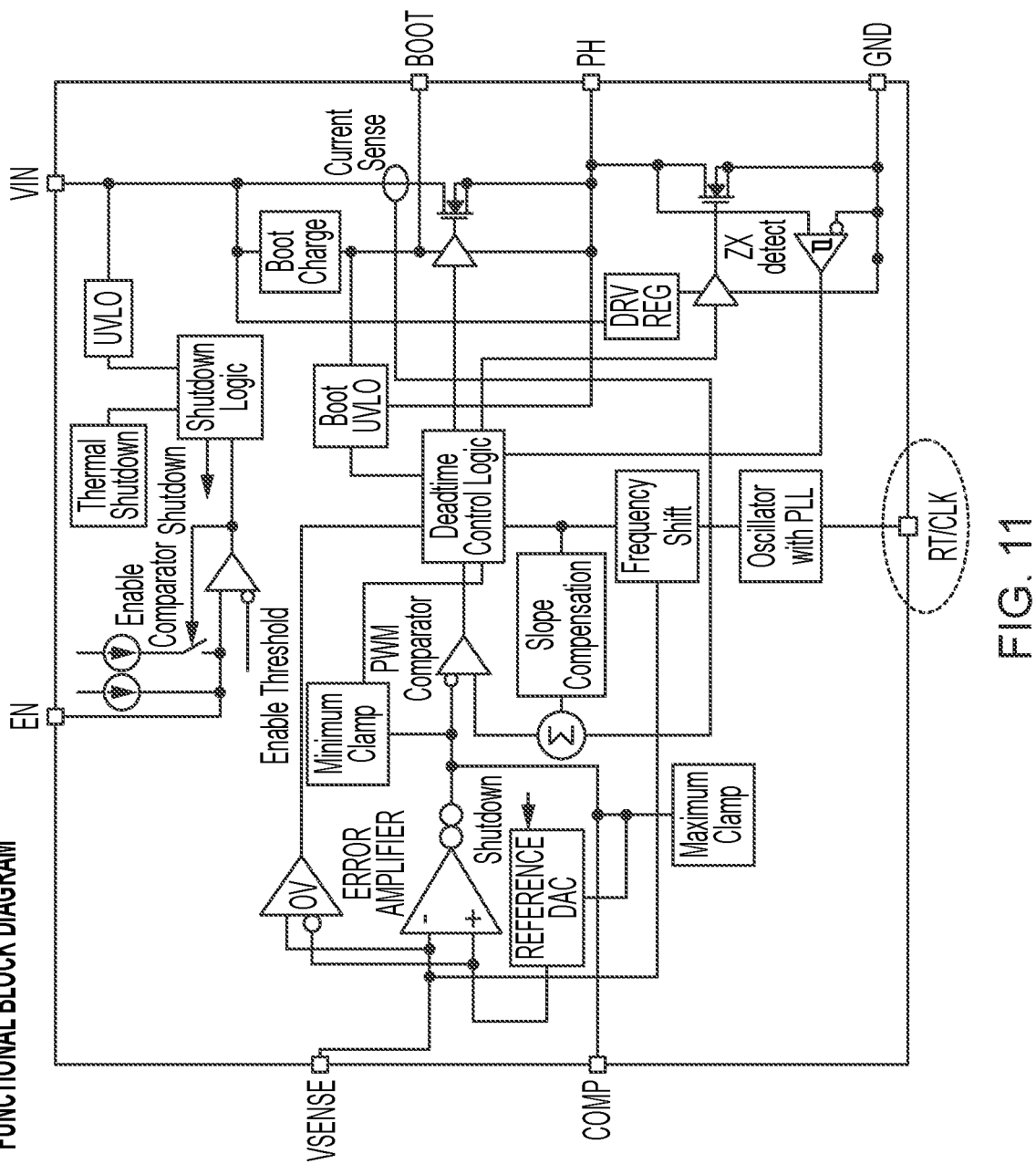
FIG. 11 is a functional block diagram of a TPS54062, which may be used as power converter in the schematized circuit diagram of FIG. 9.

In FIGS. 9-11 the (mis-)use of a camera inherent power converter, especially a TPS54062 as active element for amplitude modulation, is shown. Such a circuit allows to have an AM modulator without adding many components to the camera PCB. When a digital parameter data signal is put to the RT/CIK pin (via a small transistor as a driver), the input current of the converter rises and falls in the manner of the signal. Such a signal is detectable at the ECU side.

With both ways of having the supply power DC transmitted via inductive decoupling from the data signals or having the supply power transmitted AC as another frequency, as discussed above, the control data will be modulated to a carrier, and this may happen fully analog or partially analog, partially digital.

As an example, but not exclusively limiting AM (amplitude modulation), FM (frequency modulation), PSM (phase shift modulation), space and time modulation, QAM (quadrature amplitude modulation) or any combination thereof such as APSK (asymmetric phase-shift keying) may be the modulation methods of choice. A FM may be done by using a frequency adder. A simple adder comprises at least one non-linear component such as a diode or the like. Analog modulation methods are well studied. The most common solutions are available in several modifications in integrated circuits. The complexity and costs are mostly set by the desired signal quality especially the filter quality. The sharper the filter edges (in the frequency domain), the more costly these are.

Alternatively, another amplitude modulation (AM) may come into use. For example, and with reference to FIGS. 9-11, by switching a steady single (carrier) frequency from and to the data line on which the FBAS (or other analog or digital image data format/encryption/modulation) is already running, just this frequency and its switching harmonics will appear (such as disturbance to the FBAS or other analog or digital image data format/encryption/modulation) additionally. By (band-) filtering the carrier wave on the FBAS (or other analog or digital image data format/encryption/modulation) receiving side (ECU or other image data receiving device), the further image processing stages can be kept as usual.

Figure 4B:
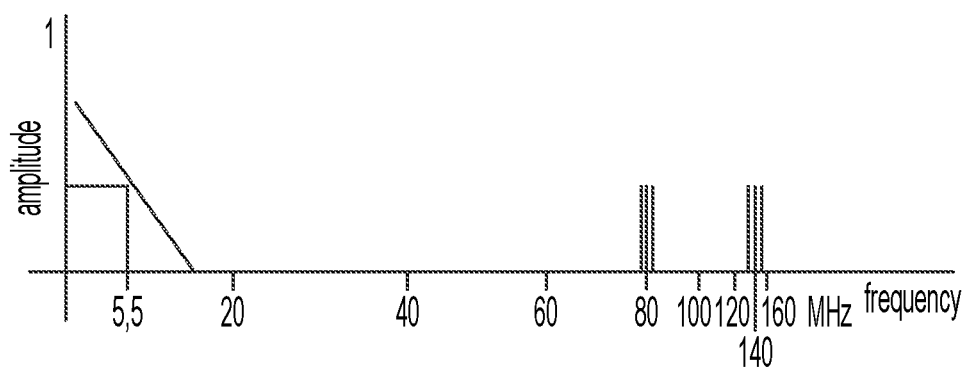
FIG. 4B is a graph of different carrier frequencies that may be selected for the camera calibration data channel, the ECU control data channel beside the video data channel of the system of the present invention.

In case it is desired that the camera also transmits data like an intrinsic parameter, feedback to control signals and the like, the camera may also have the ability (and components) to modulate its data to an analog carrier (as a second channel to the image data into the ECU's or other image receiving device's direction) as well. This carrier may be identical to (such as shown in the spectrum of FIG. 4A) or different from the carrier used by the sending unit at the ECU side (such as shown in the spectrum of FIG. 4B). When using identical carriers, the back and forth data channel (non-image) may work in half duplex, and when using different carriers, a full duplex may be possible. When using different carriers, these may be chosen to have sufficient frequency distance (acc. Shannon) for no interfering to each other.

Figure 4C:
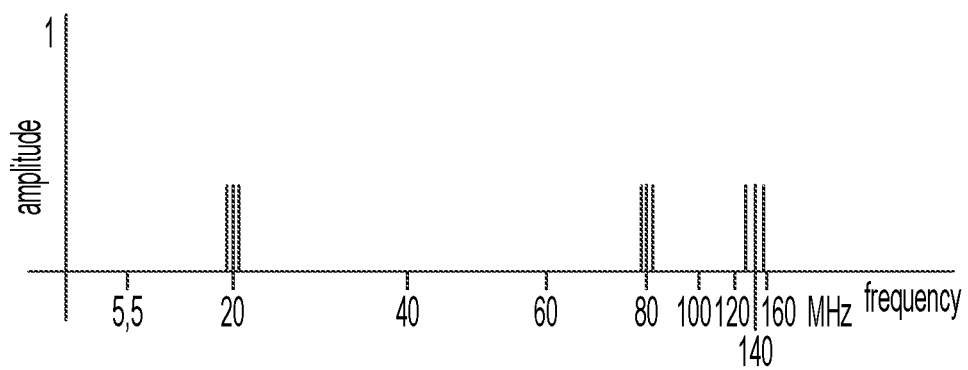
FIG. 4C is a graph of different carrier frequencies that may be selected for the camera calibration data channel, the ECU control data channel and with the video data also modulated onto a HF carrier channel of the system of the present invention.
Figure 4D:
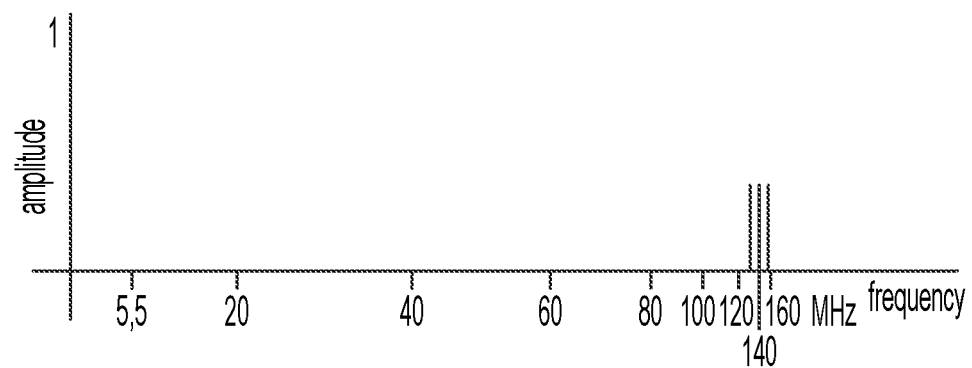
FIG. 4D is a graph of a single carrier frequency that may be selected for a common data channel of video data as well as parameter and control data of the system of the present invention.
Figure 4E:
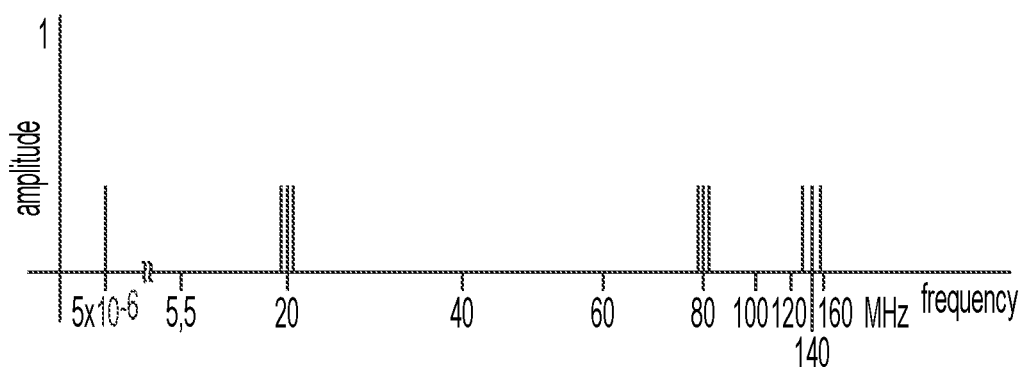
FIG. 4E is a graph of the system of the present invention showing different MHz carrier frequencies that may be selected for the camera calibration data channel, the ECU control data channel, with the video data also modulated onto a HF carrier channel, and with an additional low frequency of the camera's AC power supply.

As another option to increase the signal robustness of the video signal, also the video signal may be modulated onto a carrier using such circuits as shown in FIGS. 7A and 8A (DC supplied) and FIGS. 7B and 8B (AC supplied). Since the data bandwidths of the video channel may be the largest one, the chosen carrier frequency may preferably be higher (at an adequate Shannon distance) as the control and calibration data carrier or carriers (preferably three carriers: calibration/response data from camera to ECU; control/initialization data from ECU to camera; and video data from camera to ECU). Optionally, additional cameras' video data, possibly from a second imager in the same camera housing or an additionally attached or connected camera, may be transmitted over the same coaxial cable. The additional video data stream may also be modulated in one of the highest frequencies. Control data channels from the ECU or gate way to the camera(s) may be arranged in HF frequencies below the video data streams. The camera calibration data may be arranged in the lowest HF frequency areas due its lowest data volume. When using DC supply in accordance with the circuits of FIGS. 7A and 8A, the LF spectrum is not present, see FIG. 4C. The chosen carrier frequencies (such as shown in FIGS. 4C and 4E) may be about 20 MHz for the camera calibration data channel with +/−1 MHz bandwidths, about 80 MHz for the ECU control data channel with +/−1 MHz bandwidths and about 140 MHz for the video data channel with +/−5.5 MHz bandwidths. When using this channel configuration the video channel may be modulated FM during the control and the calibration data channel may be modulated AM. This enables the use of common video recorder chip sets.

As an alternative option it may be possible to use (misuse) the typically 5 MHz sound channel as one data channel carrier since in automotive vision typically no sound transfer is required. Though the sound bandwidths is very small. Smaller than the usually LIN bandwidth (400 kHz). As an alternative when just black and white (colorless) images are to be transferred it may be possible to use (misuse) the typically 4.43361875 MHz phase shift in which usually the color is transferred as one data channel carrier. As another aspect of the present invention, the carrier frequencies may be divider frequencies of the imager's quartz frequency.

Figure 5A:
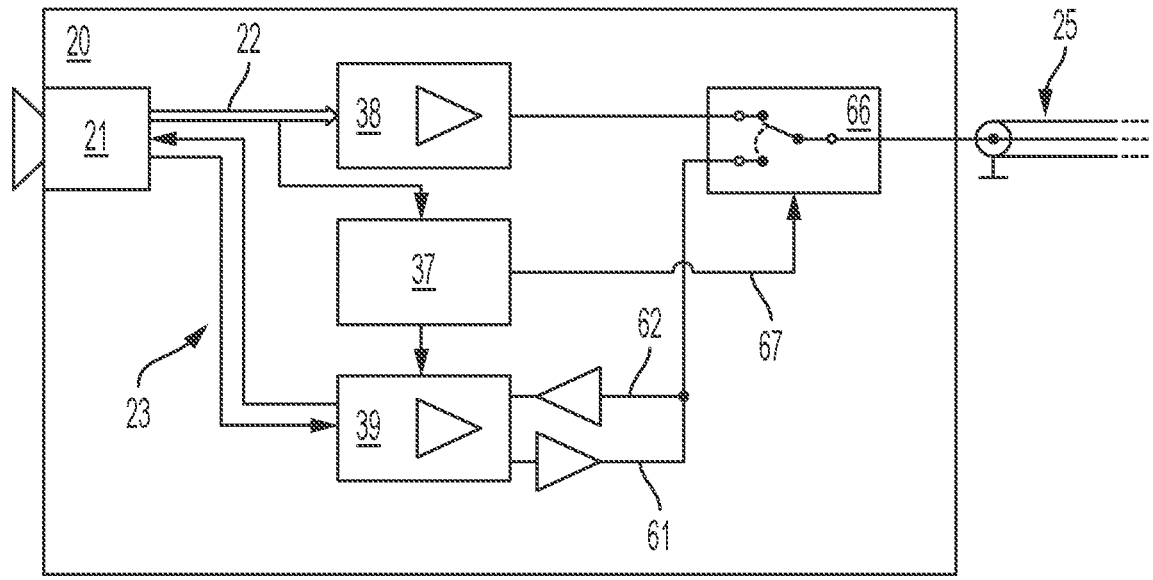
FIGS. 5A and 6A are schematics of imaging systems of the present invention transmitting the video data of the camera via (non-modulated) FBAS and bidirectional parameter and control data during the sync pause (in accordance with a frequency spectrum such as shown in FIG. 4A)
Figure 5B:
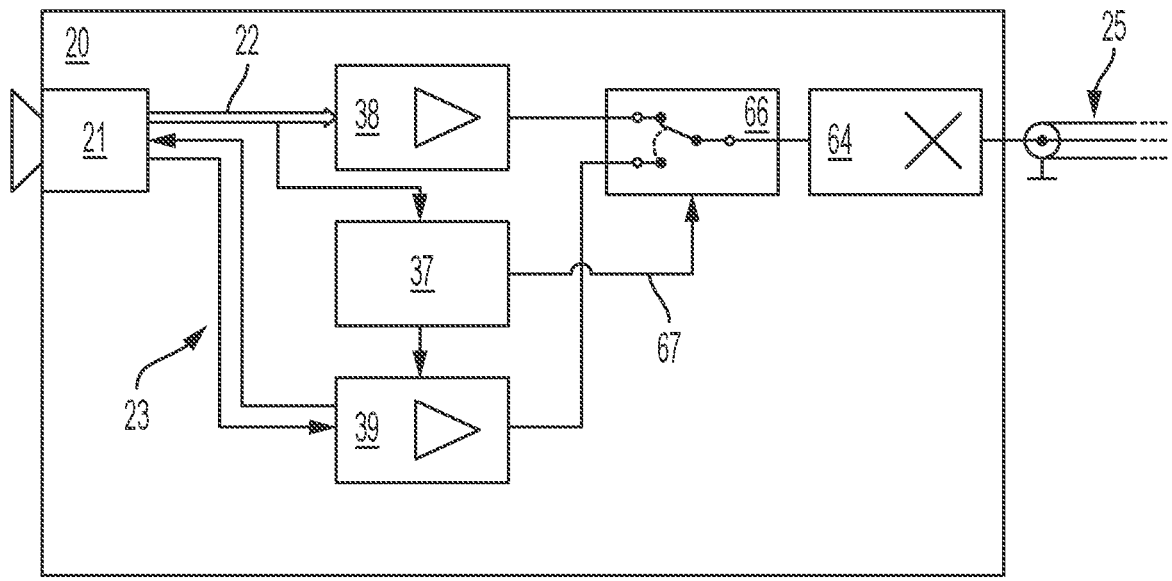
FIGS. 5B and 6B are schematics of imaging systems of the present invention transmitting the video data of the camera and bidirectional parameter and control data modulated on one (identical) carrier wave (see FIG. 4D), with the data transmitted during the sync pause.
Figure 6A:
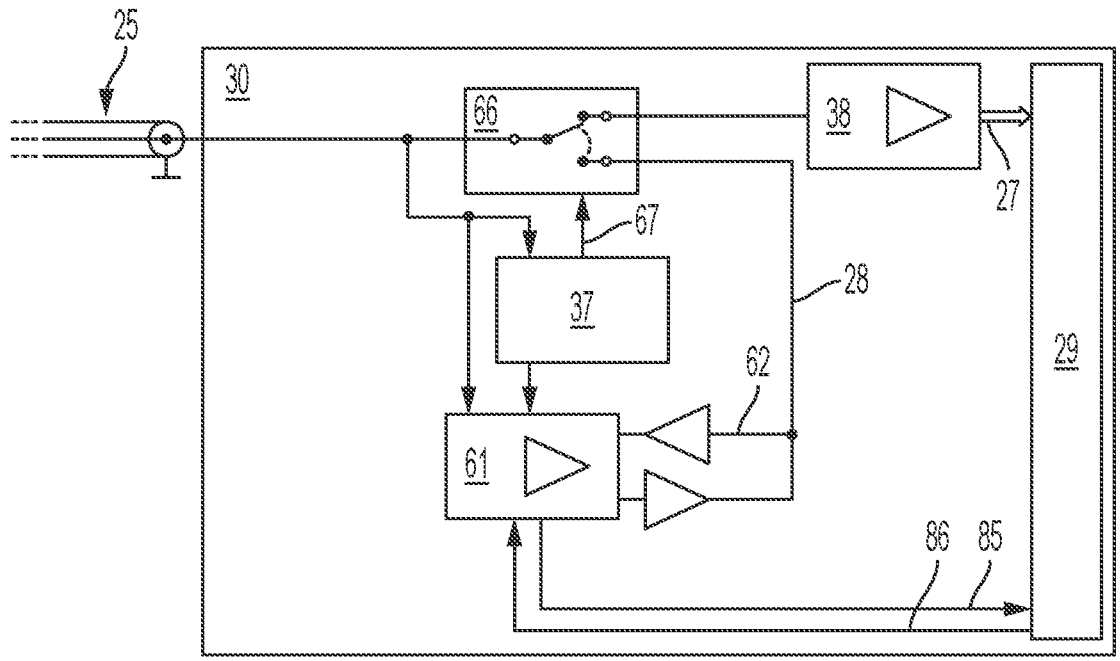
Figure 6B:
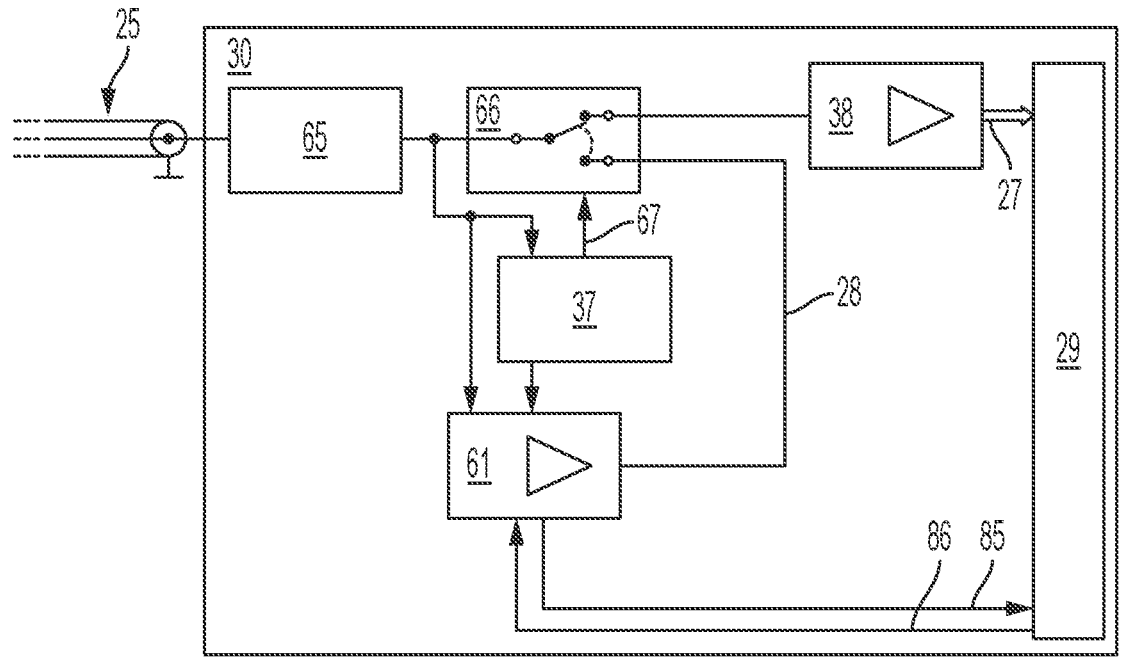

As an option for one signal channel or a shared channel by half duplex, the control and calibration data signal may be transferred during the blank interval (block diagrams or schematics of such data transmission set ups are shown in FIGS. 5A and 6A). The video signal gets transmitted unmodulated while the data signals are modulated by a pair of modulators/demodulators on each side of the coaxial cable. The according spectrum may be comparable to the one of FIG. 4A, preferably when using just one channel together with the video signal (just one carrier such as shown in the according spectrum of FIG. 4D) (block diagrams of such data transmission set ups are shown in FIGS. 5B and 6B, where the video signal gets transmitted via the identical modulator such as a frequency adder) as the data signals. The according spectrum may be comparable to the one of FIG. 4D.

Due to having just the sync pause time for parameter and calibration data transmission the possible data bandwidths is limited. The coding may be done in a Manchester code type. As an alternative, both devices may be allowed to speak or communicate or transmit in order to the video line number. In uneven lines, the ECU (or other video receiving device such as a gateway between ECU and camera) may talk to or communicate with the camera, and in even lines the camera may talk to or communicate with the ECU (or other receiving device).

As another aspect of the present invention, the receiving unit (e.g. an ECU) may use an PLL (phase lock loop) locking to a signal carrier frequency or when using AC power supply the AC frequency instead of generating it independently (on camera side). By that, frequency generating camera components such as a quartz or frequency divider circuits may be eliminable (saving cost and space and reducing the lost heat). Additionally, that configuration may be used for synchronizing the camera or multiple cameras to the ECU (or other video receiving device). Optionally, the camera synchronization control (from the ECU to the camera) may use a phase shift modulation method during the calibration and control data channels (from the camera to ECU or other video receiving device) using amplitude modulation for data transmission.

When using a camera synchronization which is switching the cameras between two modes such as described in U.S.

patent application Ser. No. 14/097,581, filed Dec. 5, 2013, now U.S. Pat. No. 9,481,301, which is hereby incorporated herein by reference in its entirety, the two modes may be switched by two phase shift pattern. Optionally, the active component of the camera voltage control (which may be AC or DC) may not be on the camera but at the sourcing (the ECU) side. Via the analog control channel, the camera may transmit a command or continuous control to the ECU voltage source control. The voltage may be raised or lowered on the ECU based on the camera's (requested) control signal. The control signal may be a PWM. The signal may be merged or incorporated with other control signals such as the I^2C.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published on Nov. 6, 2014 as U.S. Patent Publication No. US-2014-0327772; Ser. No. 14/264,443, filed Apr. 29, 2014, now U.S. Pat. No. 10,232,797; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published on Aug. 7, 2014 as U.S. Patent Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published on Aug. 7, 2014 as U.S. Patent Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 and U.S. Patent Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published on Jun. 19, 2014 as U.S. Patent Publication No. US-2014-0168437; Ser. No. 14/098,817, filed Dec. 6, 2013, and published on Jun. 19, 2014 as U.S. Patent Publication No. US-2014-0168415-A1; Ser. No. 14/097,581, filed Dec. 5, 2013, now U.S. Pat. No. 9,481,301; Ser. No. 14/093,981, filed Dec. 2, 2013, now U.S. Pat. No. 8,917,169*; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication No. US-2014-0025240; Ser. No. 13/942,753, filed Jul. 16, 2013, and published on Jan. 30, 2014 as U.S. Patent Publication No. US-2014-0028852; Ser. No. 13/927,680, filed Jun. 26, 2013, and published on Jan. 2, 2014 as U.S. Patent Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, and published on Oct. 24, 2013 as U.S. Patent Publication No. US-2013-0278769; Ser. No. 13/847,815, filed Mar. 20, 2013, and published on Oct. 21, 2013 as U.S. Patent Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013/0002873, and/or U.S. provisional applications, Ser. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. No. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; and/or Ser. No. 61/823,644, filed May 15, 2013; which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published on Jan. 3, 2013 as U.S. Patent Publication No. US-2013/0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
- an electronic control unit (ECU) configured, when installed in a vehicle equipped with the vehicular vision system, to connect via a plurality of coaxial cables of the equipped vehicle with a plurality of vehicular cameras of the equipped vehicle;
- wherein the plurality of vehicular cameras comprises at least a first vehicular camera, a second vehicular camera, a third vehicular camera, a fourth vehicular camera and a fifth vehicular camera;
- wherein the first vehicular camera comprises a first imaging sensor, and wherein the first imaging sensor of the first vehicular camera comprises a megapixel array having at least one million photosensors arranged in multiple columns and multiple rows;
- wherein the plurality of coaxial cables comprises at least a first coaxial cable, a second coaxial cable, a third coaxial cable, a fourth coaxial cable and a fifth coaxial cable;
- wherein, when installed in the equipped vehicle, the ECU connects (i) with the first vehicular camera of the equipped vehicle via the first coaxial cable, (ii) with the second vehicular camera of the equipped vehicle via the second coaxial cable, (iii) with the third vehicular camera of the equipped vehicle via the third coaxial cable, (iv) with the fourth vehicular camera of the equipped vehicle via the fourth coaxial cable and (v) with the fifth vehicular camera of the equipped vehicle via the fifth coaxial cable;
- wherein the ECU comprises a DC power supply;
- wherein the first coaxial cable (i) carries image data captured by the first vehicular camera from the first vehicular camera to the ECU, (ii) carries first camera control data from the ECU to the first vehicular camera and (iii) connects the DC power supply of the ECU to the first vehicular camera for powering the first vehicular camera;
- wherein the second coaxial cable (i) carries image data captured by the second vehicular camera from the second vehicular camera to the ECU, (ii) carries second camera control data from the ECU to the second vehicular camera and (iii) connects the DC power supply of the ECU to the second vehicular camera for powering the second vehicular camera;
- wherein the third coaxial cable (i) carries image data captured by the third vehicular camera from the third vehicular camera to the ECU, (ii) carries third camera control data from the ECU to the third vehicular camera and (iii) connects the DC power supply of the ECU to the third vehicular camera for powering the third vehicular camera;
- wherein the fourth coaxial cable (i) carries image data captured by the fourth vehicular camera from the fourth vehicular camera to the ECU, (ii) carries fourth camera control data from the ECU to the fourth vehicular camera and (iii) connects the DC power supply of the ECU to the fourth vehicular camera for powering the fourth vehicular camera;
- wherein the fifth coaxial cable (i) carries image data captured by the fifth vehicular camera from the fifth vehicular camera to the ECU, (ii) carries fifth camera control data from the ECU to the fifth vehicular camera and (iii) connects the DC power supply of the ECU to the fifth vehicular camera for powering the fifth vehicular camera;
- wherein first camera control data is carried by the first coaxial cable from the ECU to the first vehicular camera at a first camera control data carrier frequency having an associated first camera control data frequency bandwidth;
- wherein image data is carried by the first coaxial cable from the first vehicular camera to the ECU at a first image data carrier frequency having an associated first image data frequency bandwidth;
- wherein the first camera control data carrier frequency having the associated first camera control data frequency bandwidth is lower than the first image data carrier frequency having the associated first image data frequency bandwidth;
- wherein no frequency within the first camera control data frequency bandwidth of the first camera control data carrier frequency overlaps with any frequency within the first image data frequency bandwidth of the first image data carrier frequency;
- wherein second camera control data is carried by the second coaxial cable from the ECU to the second vehicular camera at a second camera control data carrier frequency having an associated second camera control data frequency bandwidth;
- wherein image data is carried by the second coaxial cable from the second vehicular camera to the ECU at a second image data carrier frequency having an associated second image data frequency bandwidth;
- wherein no frequency within the second camera control data frequency bandwidth of the second camera control data carrier frequency overlaps with any frequency within the second image data frequency bandwidth of the second image data carrier frequency;
- wherein third camera control data is carried by the third coaxial cable from the ECU to the third vehicular camera at a third camera control data carrier frequency having an associated third camera control data frequency bandwidth;
- wherein image data is carried by the third coaxial cable from the third vehicular camera to the ECU at a third image data carrier frequency having an associated third image data frequency bandwidth;
- wherein the third camera control data carrier frequency having the associated third camera control data frequency bandwidth is lower than the third image data carrier frequency having the associated third image data frequency bandwidth;
- wherein no frequency within the third camera control data frequency bandwidth of the third camera control data carrier frequency overlaps with any frequency within the third image data frequency bandwidth of the third image data carrier frequency;

wherein fourth camera control data is carried by the fourth coaxial cable from the ECU to the fourth vehicular camera at a fourth camera control data carrier frequency having an associated fourth camera control data frequency bandwidth;

wherein image data is carried by the fourth coaxial cable from the fourth vehicular camera to the ECU at a fourth image data carrier frequency having an associated fourth image data frequency bandwidth;

wherein the fourth camera control data carrier frequency having the associated fourth camera control data frequency bandwidth is lower than the fourth image data carrier frequency having the associated fourth image data frequency bandwidth;

wherein no frequency within the fourth camera control data frequency bandwidth of the fourth camera control data carrier frequency overlaps with any frequency within the fourth image data frequency bandwidth of the fourth image data carrier frequency;

wherein fifth camera control data is carried by the fifth coaxial cable from the ECU to the fifth vehicular camera at a fifth camera control data carrier frequency having an associated fifth camera control data frequency bandwidth;

wherein image data is carried by the fifth coaxial cable from the fifth vehicular camera to the ECU at a fifth image data carrier frequency having an associated fifth image data frequency bandwidth;

wherein the fifth camera control data carrier frequency having the associated fifth camera control data frequency bandwidth is lower than the fifth image data carrier frequency having the associated fifth image data frequency bandwidth;

wherein no frequency within the fifth camera control data frequency bandwidth of the fifth camera control data carrier frequency overlaps with any frequency within the fifth image data frequency bandwidth of the fifth image data carrier frequency;

wherein the ECU comprises an image processing chip;

wherein the first vehicular camera is disposed at a windshield of the equipped vehicle and views at least forward of the equipped vehicle through the windshield of the equipped vehicle; and wherein the image processing chip of the ECU processes image data captured by the first vehicular camera that is carried to the ECU via the first coaxial cable connecting the ECU with the first vehicular camera.

2. The vehicular vision system of claim 1, wherein the image processing chip processes image data captured by the first vehicular camera that is carried to the ECU via the first coaxial cable connecting the ECU with the first vehicular camera for a vehicle headlamp control system of the equipped vehicle.

3. The vehicular vision system of claim 2, wherein the first coaxial cable carries at least one intrinsic parameter of the first vehicular camera from the first vehicular camera to the ECU.

4. The vehicular vision system of claim 1, wherein the image processing chip processes image data captured by the first vehicular camera that is carried to the ECU via the first coaxial cable connecting the ECU with the first vehicular camera for a lane departure warning system of the equipped vehicle.

5. The vehicular vision system of claim 1, wherein the image processing chip processes image data captured at least by the first vehicular camera to detect an object present exterior the equipped vehicle.

6. The vehicular vision system of claim 5, wherein the object present exterior the equipped vehicle comprises a pedestrian.

7. The vehicular vision system of claim 5, wherein the object present exterior the equipped vehicle comprises a vehicle.

8. The vehicular vision system of claim 1, wherein the second, third, fourth and fifth vehicular cameras are part of a surround view system of the equipped vehicle.

9. The vehicular vision system of claim 8, wherein the third vehicular camera is disposed at a driver-side exterior rearview mirror assembly at a driver side of the equipped vehicle, and wherein the fourth vehicular camera is disposed at a passenger-side exterior rearview mirror assembly at a passenger side of the equipped vehicle.

10. The vehicular vision system of claim 9, wherein image data carried to the ECU from the second, third, fourth and fifth vehicular cameras is processed at the ECU to form bird's eye surround view images of an environment at least partially surrounding the equipped vehicle.

11. The vehicular vision system of claim 9, wherein the second vehicular camera comprises a second imaging sensor, and wherein the second imaging sensor of the second vehicular camera comprises a megapixel array having at least one million photosensors arranged in multiple columns and multiple rows, and wherein the third vehicular camera comprises a third imaging sensor, and wherein the third imaging sensor of the third vehicular camera comprises a megapixel array having at least one million photosensors arranged in multiple columns and multiple rows, and wherein the fourth vehicular camera comprises a fourth imaging sensor, and wherein the fourth imaging sensor of the fourth vehicular camera comprises a megapixel array having at least one million photosensors arranged in multiple columns and multiple rows, and wherein the fifth vehicular camera comprises a fifth imaging sensor, and wherein the fifth imaging sensor of the fifth vehicular camera comprises a megapixel array having at least one million photosensors arranged in multiple columns and multiple rows.

12. The vehicular vision system of claim 11, wherein, responsive to a driver of the equipped vehicle commencing a reversing maneuver and during the reversing maneuver of the equipped vehicle and responsive to processing at the ECU of image data carried by the second coaxial cable from the second vehicular camera to the ECU, color video images derived from image data captured by the second vehicular camera are displayed at a video display device of the equipped vehicle to assist the driver during the reversing maneuver.

13. The vehicular vision system of claim 1, wherein first camera control data carried by the first coaxial cable from the ECU to the first vehicular camera comprises first camera initialization data.

14. The vehicular vision system of claim 1, wherein the first coaxial cable carries first camera calibration data from the first vehicular camera to the ECU.

15. The vehicular vision system of claim 14, wherein the second coaxial cable carries second camera calibration data from the second vehicular camera to the ECU, and wherein the third coaxial cable carries third camera calibration data from the third vehicular camera to the ECU, and wherein the fourth coaxial cable carries fourth camera calibration data from the fourth vehicular camera to the ECU, and wherein the fifth coaxial cable carries fifth camera calibration data from the fifth vehicular camera to the ECU.

16. The vehicular vision system of claim 1, wherein the first coaxial cable carries data other than image data from the first vehicular camera to the ECU.

17. The vehicular vision system of claim 16, wherein the other data comprises at least one intrinsic parameter of the first vehicular camera.

18. The vehicular vision system of claim 17, wherein (i) the second coaxial cable carries data other than image data from the second vehicular camera to the ECU, the other data comprising at least one intrinsic parameter of the second vehicular camera, and (ii) the third coaxial cable carries data other than image data from the third vehicular camera to the ECU, the other data comprising at least one intrinsic parameter of the third vehicular camera, and (iii) the fourth coaxial cable carries data other than image data from the fourth vehicular camera to the ECU, the other data comprising at least one intrinsic parameter of the fourth vehicular camera, and (iv) the fifth coaxial cable carries data other than image data from the fifth vehicular camera to the ECU, the other data comprising at least one intrinsic parameter of the fifth vehicular camera.

19. The vehicular vision system of claim 1, wherein the first coaxial cable carries first camera calibration data from the first vehicular camera to the ECU, and wherein the first camera calibration data is carried by the first coaxial cable from the first vehicular camera to the ECU at a first camera calibration data carrier frequency having an associated first camera calibration data frequency bandwidth, and wherein the first camera calibration data carrier frequency for carrying first camera calibration data via the first coaxial cable from the first vehicular camera to the ECU is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera calibration data carrier frequency for carrying first camera calibration data via the first coaxial cable from the first vehicular camera to the ECU, and wherein no frequency within the first camera control data frequency bandwidth of the first camera control data carrier frequency overlaps with any frequency within the first camera calibration data frequency bandwidth of the first camera calibration data carrier frequency.

20. The vehicular vision system of claim 19, wherein the first image data carrier frequency on the first coaxial cable is modulated, and wherein amplitude of a signal carrying first camera control data via the first coaxial cable is modulated.

21. The vehicular vision system of claim 1, wherein the first camera control data carrier frequency of first camera control data carried by the first coaxial cable from the ECU to the first vehicular camera has a frequency that has a sufficient Shannon distance from the first image data carrier frequency of image data carried by the first coaxial cable from the first vehicular camera to the ECU.

22. The vehicular vision system of claim 1, wherein the ECU utilizes phase lock loop locking to a signal carrier frequency carried by the first coaxial cable.

23. The vehicular vision system of claim 1, wherein the vehicular vision system is operable to carry first camera control data via modulation of a carrier wave of at least one analog signal, and wherein the carrier wave has a frequency that is outside the image data frequency bandwidth of signals carrying image data via the first coaxial cable.

24. The vehicular vision system of claim 1, wherein first camera calibration data of the first vehicular camera is carried by the first coaxial cable from the first vehicular camera to the ECU at a first camera calibration data carrier frequency that is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera calibration data carrier frequency for carrying first camera calibration data via the first coaxial cable from the first vehicular camera to the ECU.

25. The vehicular vision system of claim 1, wherein at least one intrinsic parameter of the first vehicular camera is carried by the first coaxial cable from the first vehicular camera to the ECU at a first camera intrinsic parameter carrier frequency that is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera intrinsic parameter carrier frequency for carrying the at least one intrinsic parameter of the first vehicular camera via the first coaxial cable from the first vehicular camera to the ECU.

26. The vehicular vision system of claim 25, wherein the first camera control data frequency bandwidth associated with the first camera control data carrier frequency is +/−11 MHz.

27. The vehicular vision system of claim 26, wherein the first camera control data carrier frequency is 80 MHz.

28. The vehicular vision system of claim 27, wherein the first image data frequency bandwidth associated with the first image data carrier frequency is +/−5.5 MHz.

29. The vehicular vision system of claim 28, wherein the first image data carrier frequency is 140 MHz.

30. The vehicular vision system of claim 1, wherein the image processing chip processes image data captured by the first vehicular camera that is carried to the ECU via the first coaxial cable connecting the ECU with the first vehicular camera for a traffic sign detection system of the equipped vehicle.

31. The vehicular vision system of claim 30, wherein the image processing chip processing image data captured by the first vehicular camera that is carried to the ECU via the first coaxial cable connecting the ECU with the first vehicular camera comprises an EYEQ image processing chip.

32. The vehicular vision system of claim 1, wherein first camera calibration data of the first vehicular camera is carried by the first coaxial cable from the first vehicular camera to the ECU at a first camera calibration data carrier frequency having an associated first camera calibration data frequency bandwidth of +/−1 MHz.

33. The vehicular vision system of claim 32, wherein the first camera calibration data carrier frequency is 20 MHz.

34. The vehicular vision system of claim 33, wherein the first coaxial cable carries image data from the first vehicular camera to the ECU via frequency modulation of the first image data carrier frequency.

35. The vehicular vision system of claim 1, wherein the first coaxial cable carries first camera calibration data from the first vehicular camera to the ECU via amplitude modulation (AM) of a first camera calibration data carrier frequency.

36. A vehicular vision system, the vehicular vision system comprising:
- an electronic control unit (ECU) configured, when installed in a vehicle equipped with the vehicular vision system, to connect via a plurality of coaxial cables of the equipped vehicle with a plurality of vehicular cameras of the equipped vehicle;
- wherein the plurality of vehicular cameras comprises at least a first vehicular camera, a second vehicular camera, a third vehicular camera, a fourth vehicular camera and a fifth vehicular camera;
- wherein the first vehicular camera comprises a first imaging sensor, and wherein the first imaging sensor of the first vehicular camera comprises a megapixel array having at least one million photosensors arranged in multiple columns and multiple rows;
- wherein the plurality of coaxial cables comprises at least a first coaxial cable, a second coaxial cable, a third coaxial cable, a fourth coaxial cable and a fifth coaxial cable;
- wherein, when installed in the equipped vehicle, the ECU connects (i) with the first vehicular camera of the equipped vehicle via the first coaxial cable, (ii) with the second vehicular camera of the equipped vehicle via the second coaxial cable, (iii) with the third vehicular camera of the equipped vehicle via the third coaxial cable, (iv) with the fourth vehicular camera of the equipped vehicle via the fourth coaxial cable and (v) with the fifth vehicular camera of the equipped vehicle via the fifth coaxial cable;
- wherein the ECU comprises a DC power supply;
- wherein the first coaxial cable (i) carries image data captured by the first vehicular camera from the first vehicular camera to the ECU, (ii) carries first camera control data from the ECU to the first vehicular camera and (iii) connects the DC power supply of the ECU to the first vehicular camera for powering the first vehicular camera;
- wherein the second coaxial cable (i) carries image data captured by the second vehicular camera from the second vehicular camera to the ECU, (ii) carries second camera control data from the ECU to the second vehicular camera and (iii) connects the DC power supply of the ECU to the second vehicular camera for powering the second vehicular camera;
- wherein the third coaxial cable (i) carries image data captured by the third vehicular camera from the third vehicular camera to the ECU, (ii) carries third camera control data from the ECU to the third vehicular camera and (iii) connects the DC power supply of the ECU to the third vehicular camera for powering the third vehicular camera;
- wherein the fourth coaxial cable (i) carries image data captured by the fourth vehicular camera from the fourth vehicular camera to the ECU, (ii) carries fourth camera control data from the ECU to the fourth vehicular camera and (iii) connects the DC power supply of the ECU to the fourth vehicular camera for powering the fourth vehicular camera;
- wherein the fifth coaxial cable (i) carries image data captured by the fifth vehicular camera from the fifth vehicular camera to the ECU, (ii) carries fifth camera control data from the ECU to the fifth vehicular camera and (iii) connects the DC power supply of the ECU to the fifth vehicular camera for powering the fifth vehicular camera;
- wherein first camera control data is carried by the first coaxial cable from the ECU to the first vehicular camera at a first camera control data carrier frequency having an associated first camera control data frequency bandwidth;
- wherein image data is carried by the first coaxial cable from the first vehicular camera to the ECU at a first image data carrier frequency having an associated first image data frequency bandwidth;
- wherein the first camera control data carrier frequency having the associated first camera control data frequency bandwidth is lower than the first image data carrier frequency having the associated first image data frequency bandwidth;
- wherein no frequency within the first camera control data frequency bandwidth of the first camera control data carrier frequency overlaps with any frequency within the first image data frequency bandwidth of the first image data carrier frequency;
- wherein second camera control data is carried by the second coaxial cable from the ECU to the second vehicular camera at a second camera control data carrier frequency having an associated second camera control data frequency bandwidth;
- wherein image data is carried by the second coaxial cable from the second vehicular camera to the ECU at a second image data carrier frequency having an associated second image data frequency bandwidth;
- wherein the second camera control data carrier frequency having the associated second camera control data frequency bandwidth is lower than the second image data carrier frequency having the associated second image data frequency bandwidth;
- wherein no frequency within the second camera control data frequency bandwidth of the second camera control data carrier frequency overlaps with any frequency within the second image data frequency bandwidth of the second image data carrier frequency;
- wherein third camera control data is carried by the third coaxial cable from the ECU to the third vehicular camera at a third camera control data carrier frequency having an associated third camera control data frequency bandwidth;
- wherein image data is carried by the third coaxial cable from the third vehicular camera to the ECU at a third image data carrier frequency having an associated third image data frequency bandwidth;
- wherein the third camera control data carrier frequency having the associated third camera control data frequency bandwidth is lower than the third image data carrier frequency having the associated third image data frequency bandwidth;
- wherein no frequency within the third camera control data frequency bandwidth of the third camera control data carrier frequency overlaps with any frequency within the third image data frequency bandwidth of the third image data carrier frequency;
- wherein fourth camera control data is carried by the fourth coaxial cable from the ECU to the fourth vehicular camera at a fourth camera control data carrier frequency having an associated fourth camera control data frequency bandwidth;
- wherein image data is carried by the fourth coaxial cable from the fourth vehicular camera to the ECU at a fourth image data carrier frequency having an associated fourth image data frequency bandwidth;

wherein the fourth camera control data carrier frequency having the associated fourth camera control data frequency bandwidth is lower than the fourth image data carrier frequency having the associated fourth image data frequency bandwidth;

wherein no frequency within the fourth camera control data frequency bandwidth of the fourth camera control data carrier frequency overlaps with any frequency within the fourth image data frequency bandwidth of the fourth image data carrier frequency;

wherein fifth camera control data is carried by the fifth coaxial cable from the ECU to the fifth vehicular camera at a fifth camera control data carrier frequency having an associated fifth camera control data frequency bandwidth;

wherein image data is carried by the fifth coaxial cable from the fifth vehicular camera to the ECU at a fifth image data carrier frequency having an associated fifth image data frequency bandwidth;

wherein the fifth camera control data carrier frequency having the associated fifth camera control data frequency bandwidth is lower than the fifth image data carrier frequency having the associated fifth image data frequency bandwidth;

wherein no frequency within the fifth camera control data frequency bandwidth of the fifth camera control data carrier frequency overlaps with any frequency within the fifth image data frequency bandwidth of the fifth image data carrier frequency;

wherein the second, third, fourth and fifth vehicular cameras are part of a surround view system of the equipped vehicle;

wherein the third vehicular camera is disposed at a driver-side exterior rearview mirror assembly at a driver side of the equipped vehicle, and wherein the fourth vehicular camera is disposed at a passenger-side exterior rearview mirror assembly at a passenger side of the equipped vehicle;

wherein image data carried to the ECU from the second, third, fourth and fifth vehicular cameras is processed at the ECU to form bird's eye surround view images of an environment at least partially surrounding the equipped vehicle;

wherein the ECU comprises an image processing chip;

wherein the first vehicular camera is disposed at a windshield of the equipped vehicle and views at least forward of the equipped vehicle through the windshield of the equipped vehicle; and wherein the image processing chip of the ECU processes image data captured by the first vehicular camera that is carried to the ECU via the first coaxial cable connecting the ECU with the first vehicular camera for a vehicle headlamp control system of the equipped vehicle and at least one selected from the group consisting of (i) a lane departure warning system of the equipped vehicle and (ii) a traffic sign recognition system of the equipped vehicle.

37. The vehicular vision system of claim 36, wherein the second vehicular camera comprises a second imaging sensor, and wherein the second imaging sensor of the second vehicular camera comprises a megapixel array having at least one million photosensors arranged in multiple columns and multiple rows, and wherein the third vehicular camera comprises a third imaging sensor, and wherein the third imaging sensor of the third vehicular camera comprises a megapixel array having at least one million photosensors arranged in multiple columns and multiple rows, and wherein the fourth vehicular camera comprises a fourth imaging sensor, and wherein the fourth imaging sensor of the fourth vehicular camera comprises a megapixel array having at least one million photosensors arranged in multiple columns and multiple rows, and wherein the fifth vehicular camera comprises a fifth imaging sensor, and wherein the fifth imaging sensor of the fifth vehicular camera comprises a megapixel array having at least one million photosensors arranged in multiple columns and multiple rows.

38. The vehicular vision system of claim 36, wherein the first coaxial cable carries at least one intrinsic parameter of the first vehicular camera from the first vehicular camera to the ECU.

39. The vehicular vision system of claim 36, wherein first camera control data carried by the first coaxial cable from the ECU to the first vehicular camera comprises first camera initialization data.

40. The vehicular vision system of claim 36, wherein, responsive to a driver of the equipped vehicle commencing a reversing maneuver and during the reversing maneuver of the equipped vehicle and responsive to processing at the ECU of image data carried by the second coaxial cable from the second vehicular camera to the ECU, color video images derived from image data captured by the second vehicular camera are displayed at a video display device of the equipped vehicle to assist the driver during the reversing maneuver.

41. The vehicular vision system of claim 40, wherein the image processing chip processing image data captured by the first vehicular camera that is carried to the ECU via the first coaxial cable connecting the ECU with the first vehicular camera comprises an EYEQ image processing chip.

42. The vehicular vision system of claim 41, wherein the image processing chip processes image data captured at least by the first vehicular camera to detect an object present exterior the equipped vehicle.

43. The vehicular vision system of claim 42, wherein the object present exterior the equipped vehicle comprises a pedestrian.

44. The vehicular vision system of claim 42, wherein the object present exterior the equipped vehicle comprises a vehicle.

45. The vehicular vision system of claim 41, wherein the image processing chip of the ECU processes image data captured by the first vehicular camera that is carried to the ECU via the first coaxial cable connecting the ECU with the first vehicular camera for a vehicle headlamp control system of the equipped vehicle and for a lane departure warning system of the equipped vehicle and for a traffic sign recognition system of the equipped vehicle.

46. The vehicular vision system of claim 36, wherein the first coaxial cable carries first camera calibration data from the first vehicular camera to the ECU.

47. The vehicular vision system of claim 46, wherein the second coaxial cable carries second camera calibration data from the second vehicular camera to the ECU, and wherein the third coaxial cable carries third camera calibration data from the third vehicular camera to the ECU, and wherein the fourth coaxial cable carries fourth camera calibration data from the fourth vehicular camera to the ECU, and wherein the fifth coaxial cable carries fifth camera calibration data from the fifth vehicular camera to the ECU.

48. The vehicular vision system of claim 36, wherein the first coaxial cable carries data other than image data from the first vehicular camera to the ECU.

49. The vehicular vision system of claim 48, wherein the other data comprises at least one intrinsic parameter of the first vehicular camera.

50. The vehicular vision system of claim 49, wherein (i) the second coaxial cable carries data other than image data from the second vehicular camera to the ECU, the other data comprising at least one intrinsic parameter of the second vehicular camera, and (ii) the third coaxial cable carries data other than image data from the third vehicular camera to the ECU, the other data comprising at least one intrinsic parameter of the third vehicular camera, and (iii) the fourth coaxial cable carries data other than image data from the fourth vehicular camera to the ECU, the other data comprising at least one intrinsic parameter of the fourth vehicular camera, and (iv) the fifth coaxial cable carries data other than image data from the fifth vehicular camera to the ECU, the other data comprising at least one intrinsic parameter of the fifth vehicular camera.

51. The vehicular vision system of claim 36, wherein the first coaxial cable carries first camera calibration data from the first vehicular camera to the ECU, and wherein the first camera calibration data is carried by the first coaxial cable from the first vehicular camera to the ECU at a first camera calibration data carrier frequency having an associated first camera calibration data frequency bandwidth, and wherein the first camera calibration data carrier frequency for carrying first camera calibration data via the first coaxial cable from the first vehicular camera to the ECU is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera calibration data carrier frequency for carrying first camera calibration data via the first coaxial cable from the first vehicular camera to the ECU, and wherein no frequency within the first camera control data frequency bandwidth of the first camera control data carrier frequency overlaps with any frequency within the first camera calibration data frequency bandwidth of the first camera calibration data carrier frequency.

52. The vehicular vision system of claim 51, wherein the first image data carrier frequency on the first coaxial cable is modulated, and wherein amplitude of a signal carrying first camera control data via the first coaxial cable is modulated.

53. The vehicular vision system of claim 52, wherein the first camera control data carrier frequency of first camera control data carried by the first coaxial cable from the ECU to the first vehicular camera has a frequency that has a sufficient Shannon distance from the first image data carrier frequency of image data carried by the first coaxial cable from the first vehicular camera to the ECU.

54. The vehicular vision system of claim 51, wherein at least one intrinsic parameter of the first vehicular camera is carried by the first coaxial cable from the first vehicular camera to the ECU at a first camera intrinsic parameter carrier frequency that is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera intrinsic parameter carrier frequency for carrying the at least one intrinsic parameter of the first vehicular camera via the first coaxial cable from the first vehicular camera to the ECU.

55. The vehicular vision system of claim 36, wherein the ECU utilizes phase lock loop locking to a signal carrier frequency carried by the first coaxial cable.

56. The vehicular vision system of claim 36, wherein first camera calibration data of the first vehicular camera is carried by the first coaxial cable from the first vehicular camera to the ECU at a first camera calibration data carrier frequency that is lower than the first image data carrier frequency for carrying image data via the first coaxial cable from the first vehicular camera to the ECU, and wherein the first camera control data carrier frequency for carrying first camera control data via the first coaxial cable from the ECU to the first vehicular camera is higher than the first camera calibration data carrier frequency for carrying first camera calibration data via the first coaxial cable from the first vehicular camera to the ECU.

57. A vehicular vision system, the vehicular vision system comprising:

an electronic control unit (ECU) configured, when installed in a vehicle equipped with the vehicular vision system, to connect via a plurality of coaxial cables of the equipped vehicle with a plurality of vehicular cameras of the equipped vehicle;

wherein the plurality of vehicular cameras comprises at least a first vehicular camera, a second vehicular camera, a third vehicular camera, a fourth vehicular camera and a fifth vehicular camera;

wherein the first vehicular camera comprises a first imaging sensor, and wherein the first imaging sensor of the first vehicular camera comprises a megapixel array having at least one million photosensors arranged in multiple columns and multiple rows;

wherein the plurality of coaxial cables comprises at least a first coaxial cable, a second coaxial cable, a third coaxial cable, a fourth coaxial cable and a fifth coaxial cable;

wherein, when installed in the equipped vehicle, the ECU connects (i) with the first vehicular camera of the equipped vehicle via the first coaxial cable, (ii) with the second vehicular camera of the equipped vehicle via the second coaxial cable, (iii) with the third vehicular camera of the equipped vehicle via the third coaxial cable, (iv) with the fourth vehicular camera of the equipped vehicle via the fourth coaxial cable and (v) with the fifth vehicular camera of the equipped vehicle via the fifth coaxial cable;

wherein the ECU comprises a DC power supply;

wherein the first coaxial cable (i) carries image data captured by the first vehicular camera from the first vehicular camera to the ECU, (ii) carries first camera control data from the ECU to the first vehicular camera and (iii) connects the DC power supply of the ECU to the first vehicular camera for powering the first vehicular camera;

wherein first camera control data is carried by the first coaxial cable from the ECU to the first vehicular camera at a first camera control data carrier frequency having an associated first camera control data frequency bandwidth;

wherein image data is carried by the first coaxial cable from the first vehicular camera to the ECU at a first image data carrier frequency having an associated first image data frequency bandwidth;

wherein the first camera control data carrier frequency having the associated first camera control data frequency bandwidth is lower than the first image data carrier frequency having the associated first image data frequency bandwidth;
wherein no frequency within the first camera control data frequency bandwidth of the first camera control data carrier frequency overlaps with any frequency within the first image data frequency bandwidth of the first image data carrier frequency;
wherein at least one intrinsic parameter of the first vehicular camera is carried by the first coaxial cable from the first vehicular camera to the ECU at a first camera intrinsic parameter carrier frequency that is lower than the first image data carrier frequency for carrying image data via the first coaxial cable from the first vehicular camera to the ECU;
wherein the first vehicular camera is disposed at a windshield of the equipped vehicle and views at least forward of the equipped vehicle through the windshield of the equipped vehicle;
wherein the ECU comprises an image processing chip; and
wherein the image processing chip of the ECU processes image data captured by the first vehicular camera that is carried to the ECU via the first coaxial cable connecting the ECU with the first vehicular camera for at least one selected from the group consisting of (i) a vehicle headlamp control system of the equipped vehicle, (ii) a lane departure warning system of the equipped vehicle and (iii) a traffic sign recognition system of the equipped vehicle.

58. The vehicular vision system of claim 57, wherein the first camera control data carrier frequency for carrying first camera control data via the first coaxial cable from the ECU to the first vehicular camera is higher than the first camera intrinsic parameter carrier frequency for carrying the at least one intrinsic parameter of the first vehicular camera via the first coaxial cable from the first vehicular camera to the ECU.

59. The vehicular vision system of claim 57, wherein the image processing chip processes image data captured at least by the first vehicular camera to detect an object present exterior the equipped vehicle.

60. The vehicular vision system of claim 59, wherein the object present exterior the equipped vehicle comprises a pedestrian.

61. The vehicular vision system of claim 59, wherein the object present exterior the equipped vehicle comprises a vehicle.

62. The vehicular vision system of claim 61, wherein the image processing chip processing image data captured by the first vehicular camera that is carried to the ECU via the first coaxial cable connecting the ECU with the first vehicular camera comprises an EYEQ image processing chip.

63. The vehicular vision system of claim 57, wherein the ECU utilizes phase lock loop locking to a signal carrier frequency carried by the first coaxial cable.

64. The vehicular vision system of claim 57, wherein first camera calibration data of the first vehicular camera is carried by the first coaxial cable from the first vehicular camera to the ECU at a first camera calibration data carrier frequency that is lower than the first image data carrier frequency for carrying image data via the first coaxial cable from the first vehicular camera to the ECU.

65. The vehicular vision system of claim 64, wherein the first camera control data carrier frequency for carrying first camera control data via the first coaxial cable from the ECU to the first vehicular camera is higher than the first camera calibration data carrier frequency for carrying first camera calibration data via the first coaxial cable from the first vehicular camera to the ECU.

66. The vehicular vision system of claim 57, wherein the image processing chip processing image data captured by the first vehicular camera that is carried to the ECU via the first coaxial cable connecting the ECU with the first vehicular camera comprises an EYEQ image processing chip.

67. The vehicular vision system of claim 66, wherein, responsive to a driver of the equipped vehicle commencing a reversing maneuver and during the reversing maneuver of the equipped vehicle and responsive to processing at the ECU of image data carried by the second coaxial cable from the second vehicular camera to the ECU, color video images derived from image data captured by the second vehicular camera are displayed at a video display device of the equipped vehicle to assist the driver during the reversing maneuver.

68. The vehicular vision system of claim 67, wherein the second, third, fourth and fifth vehicular cameras are part of a surround view system of the equipped vehicle, and wherein the third vehicular camera is disposed at a driver-side exterior rearview mirror assembly at a driver side of the equipped vehicle, and wherein the fourth vehicular camera is disposed at a passenger-side exterior rearview mirror assembly at a passenger side of the equipped vehicle, and wherein image data carried to the ECU from the second, third, fourth and fifth vehicular cameras is processed at the ECU to form bird's eye surround view images of an environment at least partially surrounding the equipped vehicle.

* * * * *